(12) United States Patent
Elliott et al.

(10) Patent No.: US 7,397,455 B2
(45) Date of Patent: Jul. 8, 2008

(54) LIQUID CRYSTAL DISPLAY BACKPLANE LAYOUTS AND ADDRESSING FOR NON-STANDARD SUBPIXEL ARRANGEMENTS

(75) Inventors: Candice Hellen Brown Elliott, Vallejo, CA (US); Thomas Lloyd Credelle, Morgan Hill, CA (US); Matthew Osborne Schlegel, Palo Alto, CA (US); Seok Jin Han, Cupertino, CA (US)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/456,838

(22) Filed: Jun. 6, 2003

(65) Prior Publication Data

US 2004/0246404 A1    Dec. 9, 2004

(51) Int. Cl.
    G09G 3/36    (2006.01)
(52) U.S. Cl. .......................... 345/88; 349/97
(58) Field of Classification Search ........... 345/87–103, 345/690, 698, 694–695, 204–214, 82–83, 345/64, 211, 589, 55; 349/109, 97; 340/815.45; 362/555
    See application file for complete search history.

(56) References Cited

U.S. PATENT DOCUMENTS

| | | | |
|---|---|---|---|
| 3,971,065 A | 7/1976 | Bayer | |
| 4,353,062 A | 10/1982 | Lorteije | |
| 4,642,619 A | 2/1987 | Togashi | |
| 4,651,148 A | 3/1987 | Takeda et al. | |
| 4,773,737 A * | 9/1988 | Yokono et al. | 349/109 |
| 4,781,438 A | 11/1988 | Noguchi | |
| 4,800,375 A | 1/1989 | Silverstein et al. | |
| 4,822,142 A | 4/1989 | Yasui | |
| 4,853,592 A | 8/1989 | Stratham | |
| 4,874,986 A | 10/1989 | Menn et al. | |
| 4,886,343 A | 12/1989 | Johnson | |
| 4,908,609 A | 3/1990 | Stroomer | |
| 4,920,409 A | 4/1990 | Yamagishi | |
| 4,965,565 A | 10/1990 | Noguchi | |
| 5,006,840 A | 4/1991 | Hamada et al. | |

(Continued)

FOREIGN PATENT DOCUMENTS

DE    197 46 329 A1    3/1999

(Continued)

OTHER PUBLICATIONS

Thomas Credelle, "P-O: MTF of High Resolution PenTile Matrix Displays", EuroDisplay 02 Digest, pp. 1-4.

(Continued)

*Primary Examiner*—Amare Mengistu
*Assistant Examiner*—Yuk Chow

(57) ABSTRACT

Liquid crystal display backplane layouts and addressing for non-standard subpixel arrangements are disclosed. A liquid crystal display comprises a panel and a plurality of transistors. The panel substantially comprises a subpixel repeating group having an even number of subpixels in a first direction. Each thin film transistor connects one subpixel to a row and a column line at an intersection in one of a group of quadrants. The group comprises a first quadrant, a second quadrant, a third quadrant and a fourth quadrant, wherein the thin film transistors are formed in a backplane structure adjacent to intersections of the row and column lines. The thin film transistors are also substantially formed in more than one quadrant in the backplane structure.

19 Claims, 24 Drawing Sheets

U.S. PATENT DOCUMENTS

| | | | |
|---|---|---|---|
| 5,052,785 A | 10/1991 | Takimoto et al. | |
| 5,083,853 A | 1/1992 | Ueki et al. | |
| 5,097,297 A | 3/1992 | Nakazawa | |
| 5,113,274 A * | 5/1992 | Takahashi et al. | 349/109 |
| 5,124,695 A | 6/1992 | Green | |
| 5,142,392 A | 8/1992 | Ueki et al. | |
| 5,144,288 A | 9/1992 | Hamada et al. | |
| 5,184,114 A | 2/1993 | Brown | |
| 5,191,451 A | 3/1993 | Katayama et al. | |
| 5,253,091 A * | 10/1993 | Kimura et al. | 345/94 |
| 5,311,205 A | 5/1994 | Hamada et al. | |
| 5,311,337 A | 5/1994 | McCartney, Jr. | |
| 5,315,418 A | 5/1994 | Sprague et al. | |
| 5,334,996 A | 8/1994 | Tanigaki et al. | |
| 5,341,153 A | 8/1994 | Benzachawel et al. | |
| 5,384,266 A * | 1/1995 | Chapman | 438/516 |
| 5,398,066 A | 3/1995 | Martinez-Uriegas et al. | |
| 5,436,747 A | 7/1995 | Suzuki | |
| 5,459,595 A | 10/1995 | Ishiguro | |
| 5,461,503 A | 10/1995 | Deffontaines et al. | |
| 5,481,275 A * | 1/1996 | Mical et al. | 345/698 |
| 5,485,293 A | 1/1996 | Robinder | |
| 5,535,028 A | 7/1996 | Bae et al. | |
| 5,563,621 A | 10/1996 | Silsby | |
| 5,579,027 A | 11/1996 | Sakurai et al. | |
| 5,646,702 A | 7/1997 | Akinwande et al. | |
| 5,648,793 A | 7/1997 | Chen | |
| 5,739,802 A * | 4/1998 | Mosier | 345/89 |
| 5,754,163 A | 5/1998 | Kwon | |
| 5,754,226 A | 5/1998 | Yamada et al. | |
| 5,767,829 A | 6/1998 | Verhulst | |
| 5,808,594 A | 9/1998 | Tsuboyama et al. | |
| 5,818,405 A | 10/1998 | Eglit et al. | |
| 5,818,968 A | 10/1998 | Yoshimoto | |
| 5,877,512 A | 3/1999 | Kim | |
| 5,899,550 A | 5/1999 | Masaki | |
| 5,949,396 A | 9/1999 | Lee | |
| 5,971,546 A | 10/1999 | Park | |
| 6,005,692 A | 12/1999 | Stahl | |
| 6,008,868 A | 12/1999 | Silverbrook | |
| 6,023,315 A | 2/2000 | Harrold et al. | |
| 6,037,719 A | 3/2000 | Yap et al. | |
| 6,064,363 A | 5/2000 | Kwon | |
| 6,069,670 A | 5/2000 | Borer | |
| 6,088,050 A | 7/2000 | Ng | |
| 6,097,367 A | 8/2000 | Kuriwaki et al. | |
| 6,108,122 A | 8/2000 | Ulrich et al. | |
| 6,115,092 A | 9/2000 | Greene et al. | |
| 6,144,352 A | 11/2000 | Matsuda et al. | |
| 6,147,664 A | 11/2000 | Hansen | |
| 6,151,001 A | 11/2000 | Anderson et al. | |
| 6,160,535 A | 12/2000 | Park | |
| 6,188,385 B1 | 2/2001 | Hill et al. | |
| 6,198,507 B1 | 3/2001 | Ishigami | |
| 6,219,019 B1 | 4/2001 | Hasegawa | |
| 6,219,025 B1 | 4/2001 | Hill et al. | |
| 6,225,967 B1 | 5/2001 | Hebiguchi | |
| 6,225,973 B1 | 5/2001 | Hill et al. | |
| 6,236,390 B1 | 5/2001 | Hitchcock | |
| 6,239,783 B1 | 5/2001 | Hill et al. | |
| 6,243,055 B1 | 6/2001 | Fergason | |
| 6,243,070 B1 | 6/2001 | Hill et al. | |
| 6,278,434 B1 | 8/2001 | Hill et al. | |
| 6,326,981 B1 | 12/2001 | Mori et al. | |
| 6,327,008 B1 | 12/2001 | Fujiyoshi | |
| 6,332,030 B1 | 12/2001 | Manjunath | |
| 6,335,719 B1 * | 1/2002 | An et al. | 345/98 |
| 6,340,998 B1 | 1/2002 | Kim et al. | |
| 6,342,876 B1 | 1/2002 | Kim | |
| 6,348,929 B1 | 2/2002 | Acharya | |
| 6,377,262 B1 | 4/2002 | Hitchcock et al. | |
| 6,388,644 B1 | 5/2002 | De Zwart et al. | |
| 6,392,717 B1 | 5/2002 | Kunzman | |
| 6,393,145 B2 | 5/2002 | Betrisey et al. | |
| 6,396,505 B1 | 5/2002 | Lui | |
| 6,469,756 B1 | 10/2002 | Booth, Jr. | |
| 6,469,766 B2 | 10/2002 | Waterman et al. | |
| 6,545,653 B1 | 4/2003 | Takahara | |
| 6,552,706 B1 | 4/2003 | Ikeda et al. | |
| 6,552,707 B1 * | 4/2003 | Fujiyoshi | 345/98 |
| 6,570,584 B1 | 5/2003 | Cok et al. | |
| 6,590,555 B2 * | 7/2003 | Su et al. | 345/92 |
| 6,624,828 B1 | 9/2003 | Dresevic et al. | |
| 6,661,429 B1 * | 12/2003 | Phan | 345/694 |
| 6,674,430 B1 | 1/2004 | Kaufman | |
| 6,674,436 B1 | 1/2004 | Dresevic et al. | |
| 6,680,761 B1 | 1/2004 | Greene et al. | |
| 6,714,206 B1 | 3/2004 | Martin et al. | |
| 6,714,212 B1 | 3/2004 | Tsuboyama et al. | |
| 6,714,243 B1 | 3/2004 | Mathur et al. | |
| 6,727,878 B2 | 4/2004 | Okuzono et al. | |
| 6,738,204 B1 * | 5/2004 | Chuang et al. | 359/891 |
| 6,750,875 B1 | 6/2004 | Keely, Jr. | |
| 6,771,028 B1 | 8/2004 | Winters | |
| 6,804,407 B2 | 10/2004 | Weldy | |
| 6,833,890 B2 | 12/2004 | Hong et al. | |
| 6,836,300 B2 | 12/2004 | Choo et al. | |
| 6,850,294 B2 | 2/2005 | Roh et al. | |
| 6,867,549 B2 | 3/2005 | Cok et al. | |
| 6,885,380 B1 | 4/2005 | Primerano et al. | |
| 6,888,604 B2 | 5/2005 | Rho et al. | |
| 6,897,876 B2 | 5/2005 | Murdoch et al. | |
| 6,903,378 B2 | 6/2005 | Cok | |
| 6,927,754 B2 | 8/2005 | Lai | |
| 6,930,676 B2 | 8/2005 | De Haan et al. | |
| 6,937,217 B2 | 8/2005 | Klompenhouwer et al. | |
| 6,995,346 B2 | 2/2006 | Johanneson et al. | |
| 7,102,605 B2 * | 9/2006 | Stumbo et al. | 345/87 |
| 7,110,012 B2 | 9/2006 | Messing et al. | |
| 7,129,955 B2 | 10/2006 | Motomura | |
| 7,151,518 B2 | 12/2006 | Fukumoto | |
| 7,167,275 B2 | 1/2007 | Kukusawa | |
| 7,187,353 B2 | 3/2007 | Credelle et al. | |
| 7,209,105 B2 | 4/2007 | Elliott | |
| 7,218,301 B2 | 5/2007 | Credelle | |
| 7,230,667 B2 | 6/2007 | Shin et al. | |
| 2001/0015716 A1 | 8/2001 | Kim | |
| 2001/0017607 A1 | 8/2001 | Kwon et al. | |
| 2001/0048764 A1 | 12/2001 | Betrisey et al. | |
| 2001/0052897 A1 | 12/2001 | Nakano et al. | |
| 2002/0015110 A1 * | 2/2002 | Elliott | 348/589 |
| 2002/0030780 A1 | 3/2002 | Nishida et al. | |
| 2002/0093476 A1 | 7/2002 | Hill et al. | |
| 2002/0149598 A1 | 10/2002 | Greier et al. | |
| 2002/0158997 A1 | 10/2002 | Fukami et al. | |
| 2003/0006978 A1 | 1/2003 | Fujiyoshi | |
| 2003/0011603 A1 | 1/2003 | Koyama | |
| 2003/0016310 A1 | 1/2003 | Lee et al. | |
| 2003/0034992 A1 | 2/2003 | Elliott et al. | |
| 2003/0071943 A1 | 4/2003 | Choo et al. | |
| 2003/0077000 A1 | 4/2003 | Blinn | |
| 2003/0090581 A1 | 5/2003 | Credelle et al. | |
| 2003/0117423 A1 | 6/2003 | Elliott et al. | |
| 2003/0128179 A1 | 7/2003 | Credelle | |
| 2003/0128225 A1 | 7/2003 | Credelle et al. | |
| 2003/0146893 A1 | 8/2003 | Sawabe | |
| 2003/0189537 A1 * | 10/2003 | Yun | 345/87 |
| 2003/0214499 A1 | 11/2003 | Ohsawa et al. | |
| 2003/0218618 A1 | 11/2003 | Phan | |
| 2004/0008208 A1 | 1/2004 | Dresevic et al. | |
| 2004/0021804 A1 | 2/2004 | Hong et al. | |
| 2004/0046714 A1 | 3/2004 | Elliott | |
| 2004/0061710 A1 | 4/2004 | Messing et al. | |
| 2004/0075764 A1 | 4/2004 | Law et al. | |

| | | | |
|---|---|---|---|
| 2004/0085495 A1 | 5/2004 | Roh et al. | |
| 2004/0094766 A1 | 5/2004 | Lee et al. | |
| 2004/0095521 A1 | 5/2004 | Song et al. | |
| 2004/0104873 A1 | 6/2004 | Kang et al. | |
| 2004/0108818 A1 | 6/2004 | Cok et al. | |
| 2004/0114046 A1 | 6/2004 | Lee et al. | |
| 2004/0140983 A1 | 7/2004 | Credelle | |
| 2004/0150651 A1 | 8/2004 | Phan | |
| 2004/0155895 A1 | 8/2004 | Lai | |
| 2004/0169807 A1 | 9/2004 | Rho et al. | |
| 2004/0174389 A1 | 9/2004 | Ben-David et al. | |
| 2004/0179160 A1 | 9/2004 | Rhee et al. | |
| 2004/0189662 A1 | 9/2004 | Frisken et al. | |
| 2004/0189664 A1 | 9/2004 | Frisken et al. | |
| 2004/0213449 A1 | 10/2004 | Safaee-Rad | |
| 2004/0223005 A1 | 11/2004 | Lee | |
| 2004/0239813 A1 | 12/2004 | Klompenhouwer | |
| 2004/0239837 A1 | 12/2004 | Hong et al. | |
| 2004/0246213 A1 | 12/2004 | Credelle et al. | |
| 2004/0246278 A1 | 12/2004 | Elliott | |
| 2004/0246279 A1 | 12/2004 | Credelle et al. | |
| 2004/0246280 A1 | 12/2004 | Credelle et al. | |
| 2004/0246381 A1 | 12/2004 | Credelle | |
| 2004/0246404 A1 | 12/2004 | Elliott et al. | |
| 2004/0247070 A1 | 12/2004 | Ali | |
| 2004/0263528 A1 | 12/2004 | Murdoch et al. | |
| 2005/0007539 A1 | 1/2005 | Taguchi et al. | |
| 2005/0024380 A1 | 2/2005 | Lin et al. | |
| 2005/0040760 A1 | 2/2005 | Taguchi et al. | |
| 2005/0068477 A1 | 3/2005 | Shin et al. | |
| 2005/0083277 A1 | 4/2005 | Credlle | |
| 2005/0083356 A1 | 4/2005 | Roh et al. | |
| 2005/0099426 A1 | 5/2005 | Primerano et al. | |
| 2005/0140634 A1 | 6/2005 | Takatori | |
| 2005/0151752 A1 | 7/2005 | Phan | |
| 2005/0162600 A1 | 7/2005 | Rho et al. | |
| 2005/0219274 A1 | 10/2005 | Yang et al. | |

FOREIGN PATENT DOCUMENTS

| | | |
|---|---|---|
| DE | 299 09 537 U1 | 10/1999 |
| DE | 199 23 527 | 11/2000 |
| DE | 201 09 354 U1 | 9/2001 |
| EP | 0 158 366 A2 | 10/1985 |
| EP | 0 203 005 A1 | 11/1986 |
| EP | 0 322 106 | 6/1989 |
| EP | 0 671 650 A2 | 9/1995 |
| EP | 0 812 114 A1 | 12/1997 |
| EP | 0 878 969 A3 | 11/1998 |
| EP | 0 899 604 A2 | 3/1999 |
| EP | 1 261 014 A2 | 11/2002 |
| EP | 1 381 020 A2 | 1/2004 |
| GB | 2 133 912 A | 8/1984 |
| GB | 2 146 478 A | 4/1985 |
| JP | 60-107022 | 6/1985 |
| JP | 02-000826 A | 1/1990 |
| JP | 03-78390 | 4/1991 |
| JP | 06-102503 | 4/1994 |
| JP | 06-324649 | 11/1994 |
| JP | 08-202317 | 8/1996 |
| JP | 02-983027 | 11/1999 |
| JP | 2004004822 | 8/2004 |
| JP | 200478218 | 11/2004 |
| TW | 491987 | 8/2001 |
| TW | 448333 | 6/2002 |
| WO | WO 00/21067 | 4/2000 |
| WO | WO 00/42762 | 7/2000 |
| WO | WO 00/45365 | 8/2000 |
| WO | WO 00/65432 | 11/2000 |
| WO | WO 01/10112 A2 | 2/2001 |
| WO | WO 01/52546 A2 | 7/2001 |
| WO | WO 02/059685 A2 | 8/2002 |
| WO | WO 02/099557 A2 | 12/2002 |
| WO | WO 02/101644 A2 | 12/2002 |
| WO | WO 03/014819 A1 | 2/2003 |
| WO | WO 03/050605 A1 | 2/2003 |
| WO | WO 03/034380 A2 | 4/2003 |
| WO | WO 03/056383 A1 | 7/2003 |
| WO | WO 2004/017129 A1 | 2/2004 |
| WO | WO 2004/021323 A2 | 3/2004 |
| WO | WO 2004/027503 A1 | 4/2004 |
| WO | WO 2004/086128 A1 | 10/2004 |
| WO | WO 2005/050296 A1 | 6/2005 |

OTHER PUBLICATIONS

Scott Daly, "Analysis of Subtriad Addressing Algorithms by Visual System Models", Sid 01 Digest, pp. 1200-1203.

Candice Elliott, "Active Matrix Display . . . ", IDMC 2000, 185-189, Feb. 8, 2000.

Candice Elliott, "Color Subpixel Rendering Projectors and Flat Panel Displays". SMPTE, pp. 1-4, Feb. 17-Mar. 1, 2003, Seattle.

Michael Klompenhouwer, Subpixel Image Scaling for Color Matrix Displays, SID Symp. Digest, May 2002, pp. 176-179.

Baek-Woon Lee et al., "40.5L: Late-News Paper: TFT-LCD with RGBW Color Systems", SID 03 Digest, 2003, pp. 1212-1215.

Dean Messing et al., Improved Display Resolution of Subampled Colour Images Using Subpixel Addressing, IEEE ICIP 2002, pp. 625-628.

Dean Messing et al., Subpixel Rendering on Non-Striped Colour Matrix Displays:, 2003 International Conf. on Image Processing, Sep. 2003, Barcelona, Spain.

Candice Brown Elliott, "Reducing Pixel Count . . . ", SID Symp. Digest, Dec. 1999, pp. 22-25.

Candice Brown Elliott etal., "New Pixel Layout for PenTile Matrix Architecture", IDMC 2002.

Candice Brown Elliott et al., "Development of the PenTile Matrix Color AMLCD . . . ", SID Digest, 2003.

Candice Brown Elliott et al., "Co-Optimization of Color AMLCD Subpixel Architecture . . . ", SID 2002 Proceeding Paper, May 30, 2002.

Brown Elliott, C, "Pentile Matrix™ Displays and Drivers" ADEAC Proceedings Paper, Portland OR., Oct. 2005.

Krantz, John et al., Color Matrix Display Image Quality: The Effects of Luminance . . . SID 90 Digest, pp. 29-32.

Okumura et al., "A New Flicker-Reduction Drive Method for High Resolution LCTVs", SID Digest,pp. 551-554, 2001.

USPTO, Non-Final Office Action dated Oct. 26, 2005 in US Patent Publication No. 2004/0246213 (U.S. Appl. No. 10/455,925).

Clairvoyant, Inc, Response to Non-Final Office Action dated Apr. 26, 2006 in US Patent Publication No. 2004/0246213 (U.S. Appl. No. 10/455,925).

USPTO, Final Office Action dated Jun. 14, 2006 in US Patent Publication No. 2004/0246213 (U.S. Appl. No. 10/455,925).

USPTO, Non-Final Office Action dated Oct. 19, 2004 in US Patent Publication No. 2004/0246381 (U.S. Appl. No. 10/455,931).

Clairvoyante Inc, Response to Non-Final Office Action dated Jan. 18, 2005 in US Patent Publication No. 2004/0246381 (U.S. Appl. No. 10/455,931).

USPTO, Final Office Action dated Jul. 12, 2005 in US Patent Publication No. 2004/0246381 (U.S. Appl. No. 10/455,931).

Clairvoyante Inc, Response to Final Office Action dated Jan. 12, 2006 in US Patent Publication No. 2004/0246381 (U.S. Appl. No. 10/455,931).

USPTO, Non-Final Office Action dated May 1, 2006 in US Patent Publication No. 2004/0246381 (U.S. Appl. No. 10/455,931).

USPTO, Non-Final Office Action dated Jan. 23, 2006 in US Patent Publication No. 2004/0246278 (U.S. Appl. No. 10/455,927).

Clairvoyante Inc, Response to Non-Final Office Action dated May 19, 2006 in US Patent Publication No. 2004/0246278 (U.S. Appl. No. 10/455,927).

USPTO, Final Office Action dated Aug. 9, 2006 in US Patent Publication No. 2004/024678 (U.S. Appl. No. 10/455,927).

USPTO, Non-Final Office Action dated Oct. 19, 2005 in US Patent Publication No. 2004/0246279 (U.S. Appl. No. 10/456,806).

Clairvoyante Inc, Response to Non-Final Office Action dated Jan. 18, 2005 in US Patent Publication No. 2004/0246279 (U.S. Appl. No. 10/456,806).
USPTO, Final Office Action dated May 2, 2006 in US Patent Publication No. 2004/0246279 (U.S. Appl. No. 10/456,806).
Clairvoyante Inc, Response to Final Office Action dated Aug. 2, 2006 in US Patent Publication No. 2004/0246279 (U.S. Appl. No. 10/456,806).
USPTO, Non-Final Office Action dated Mar. 20, 2006 in US Patent Publication No. 2004/0246280 (U.S. Appl. No. 10/456,839).
Clairvoyante Inc, Response to Non-Final Office Action dated Jun. 20, 2006 in US Patent Publication No. 2004/0246280 (U.S. Appl. No. 10/456,839).
USPTO, Non-Final Office Action dated May 4, 2006 in US Patent Publication No. 2005/0083277 (U.S. Appl. No. 10/696,236).
Clairvoyante Inc, Response to Non-Final Office Action dated Aug. 4, 2006 in US Patent Publication No. 2005/0083277 (U.S. Appl. No. 10/696,236).
PCT International Search Report dated Dec. 9, 2005 for PCT/US04/18034 (U.S. Appl. No. 10/455,925).
PCT International Search Report dated Feb. 1, 2006 for PCT/US04/18038 (U.S Appl. No. 10/455,931).
PCT International Search Report dated Mar. 15, 2006 for PCT/US04/18033 (U.S. Appl. No. 10/455,927).
PCT International Search Report dated Jan. 10, 2006 for PCT/US04/18035 (U.S. Appl. No. 10/456,806).
PCT International Search Report dated Sep. 24, 2004 for PCT/US04/17796 (U.S. Appl. No. 10/456,838).
PCT International Search Report dated Feb. 24, 2005 for PCT/US04/18037 (U.S. Appl. No. 10/456,794).
PCT International Search Report dated Nov. 3, 2004 for PCT/US04/18036 (U.S. Appl. No. 10/696,236).
Taiwan Search Report dated Feb. 2, 2007 for TW Application No. 093116110 (U.S. Appl. No. 10/456,838).
USPTO, Non-Final Office Action, dated Nov. 16, 2004 in US Patent Publication No. 2003/0128225, (U.S. Appl. No. 10/278,353).
Clairvoyante Inc, Response to Non-Final Office Action, dated Apr. 15, 2005 in US Patent Publication No. 2003/0128225, (U.S. Appl. No. 10/278,353).
USPTO, Non-Final Office Action, dated Jul. 12, 2005 in US Patent Publication No. 2003/0128225, (U.S. Appl. No. 10/278,353).
Clairvoyante Inc, Response to Non-Final Office Action, dated Jan. 12, 2006 in US Patent Publication No. 2003/0128225, (U.S. Appl. No. 10/278,353).
USPTO, Final Office Action, dated Apr. 18, 2006 in US Patent Publication No. 2003/0128225, (U.S. Appl. No. 10/278,353).
Clairvoyante Inc, Response to Final Office Action, dated Sep. 18, 2006 in US Patent Publication No. 2003/0128225, (U.S. Appl. No. 10/278,353).
USPTO, Non-Final Office Action, dated Mar. 2, 2007 in US Patent Publication No. 2003/0128225, (U.S. Appl. No. 10/278,353).
USPTO, Non-Final Office Action, dated Nov. 16, 2004 in US Patent Publication No. 2003/0128179, (U.S. Appl. No. 10/278,352).
Clairvoyante Inc, Response to Non-Final Office Action, dated Apr. 15, 2005 in US Patent Publication No. 2003/0128179, (U.S. Appl. No. 10/278,352).
USPTO, Non-Final Office Action, dated Jul. 12, 2005 in US Patent Publication No. 2003/0128179, (U.S. Appl. No. 10/278,352).
Clairvoyante Inc, Response to Non-Final Office Action, dated Jan. 12, 2006 in US Patent Publication No. 2003/0128179, (U.S. Appl. No. 10/278,352).
USPTO, Final Office Action, dated Sep. 18, 2006 in US Patent Publication No. 2003/0128179, (U.S. Appl. No. 10/278,352).
Clairvoyante Inc, Response to Final Office Action, dated Dec. 6, 2006 in US Patent Publication No. 2003/0128179, (U.S. Appl. No. 10/278,352).
Clairvoyante, Inc, Repsonse to Non-Final Office Action dated Nov. 10, 2006 in US Patent Publication No. 2004/0246213 (U.S. Appl. No. 10/455,925).
USPTO, Final Office Action dated Feb. 14, 2007 in US Patent Publication No. 2004/0246213 (U.S. Appl. No. 10/455,925).
Clairvoyante Inc, Response to Non-Final Office Action dated Oct. 2, 2006 in US Patent Publication No. 2004/0246381 (U.S. Appl. No. 10/455,931).
Clairvoyante Inc, Response to Non-Final Office Action dated Nov. 20, 2006 in US Patent Publication No. 2004/0246278 (U.S. Appl. No. 10/455,927).
USPTO, Notice of Allowance, dated Sep. 18, 2006 in US Patent No. 7,187,353 (U.S. Appl. No. 10/456,806).
USPTO, Non-Final Office Action dated Jul. 26, 2004 in US Patent Publication No. 2004/0246393 (U.S. Appl. No. 10/456,794).
Clairvoyante Inc, Response to Non-Final Office Action dated Nov. 8, 2004 in US Patent Publication No. 2004/0246393 (U.S. Appl. No. 10/456,794).
USPTO, Non-Final Office Action dated May 4, 2005 in US Patent Publication No. 2004/0246393 (U.S. Appl. No. 10/456,794).
Clairvoyante Inc, Response to Non-Final Office Action dated Nov. 3, 2005 in US Patent Publication No. 2004/0246393 (U.S. Appl. No. 10/456,794).
USPTO, Final Office Action dated Jan. 18, 2007 in US Patent Publication No. 2004/0246393 (U.S. Appl. No. 10/456,794).
USPTO, Final Office Action dated Aug. 29, 2006 in US Patent Publication No. 2004/0246280 (U.S. Appl. No. 10/456,839).
Clairvoyante Inc, Response to Final Office Action dated Feb. 23, 2007 in US Patent Publication No. 2004/0246280 (U.S. Appl. No. 10/456,839).
USPTO, Final Office Action dated Oct. 17, 2006 in US Patent Publication No. 2005/0083277 (U.S. Appl. No. 10/696,236).
Clairvoyante Inc, Response to Final Office Action dated Mar. 16, 2007 in US Patent Publication No. 2005/0083277 (U.S. Appl. No. 10/696,236).
Michiel A. Klompenhouwer, Gerard de Haan, Subpixel image scaling for color matrix displays, Journal of the Society for Information Display, vol. 11, Issue 1, Mar. 2003, pp. 99-108.
USPTO, Non-Final Office Action, dated Jun. 27, 2007 in US Patent Publication No. 2003/0128179, (U.S. Appl. No. 10/278,352).
Clairvoyante Inc, Response to Non-Final Office Action, dated Dec. 27, 2007 in US Patent Publication No. 2003/0128179, (U.S. Appl. No. 10/278,352).
Clairvoyante, Inc, Response to Non-Final office Action dated Jul. 13, 2007 in US Patent Publication No. 2004/0246213 (U.S. Appl. No. 10/455,925).
USPTO, Final Office Action dated Aug. 30, 2007 in US Patent Publication No. 2004/0246213 (U.S. Appl. No. 10/455,925).
Clairvoyante Inc, Response to Non-Final Office Action dated Jul. 16, 2007 in US Patent Publication No. 2004/0246393 (U.S. Appl. No. 10/456,794).
USPTO, Non-Final Office Action dated Oct. 9, 2007 in US Patent Publication No. 2004/0246393 (U.S. Appl. No. 10/456,794).
USPTO, Non-Final Office Action dated May 16, 2007 in US Patent Publication No. 2004/0246280 (U.S. Appl. No. 10/456,839).
USPTO, Non-Final Office Action dated May 23, 2007 in US Patent Publication No. 2005/0083277 (U.S. Appl. No. 10/696,236).
India Patent Office, Office Action dated May 22, 2007 in 5583/DELNP/2005 filed in USPTO as US Patent Publication No. 2005/0083277 (U.S. Appl. No. 10/696,236).
European Patent Office, Office Action dated Oct. 5, 2007 in 04 754 603.1-2205 filed in USPTO as US Patent Publication No. 2005/0083277 (U.S. Appl. No. 10/696,236).

* cited by examiner

902

| R | B | G | B | R | B |
|---|---|---|---|---|---|
| G | B | R | B | G | B |
| R | B | G | B | R | B |
| G | B | R | B | G | B |
| R | B | G | B | R | B |
| G | B | R | B | G | B |
| R | B | G | B | R | B |
| G | B | R | B | G | B |

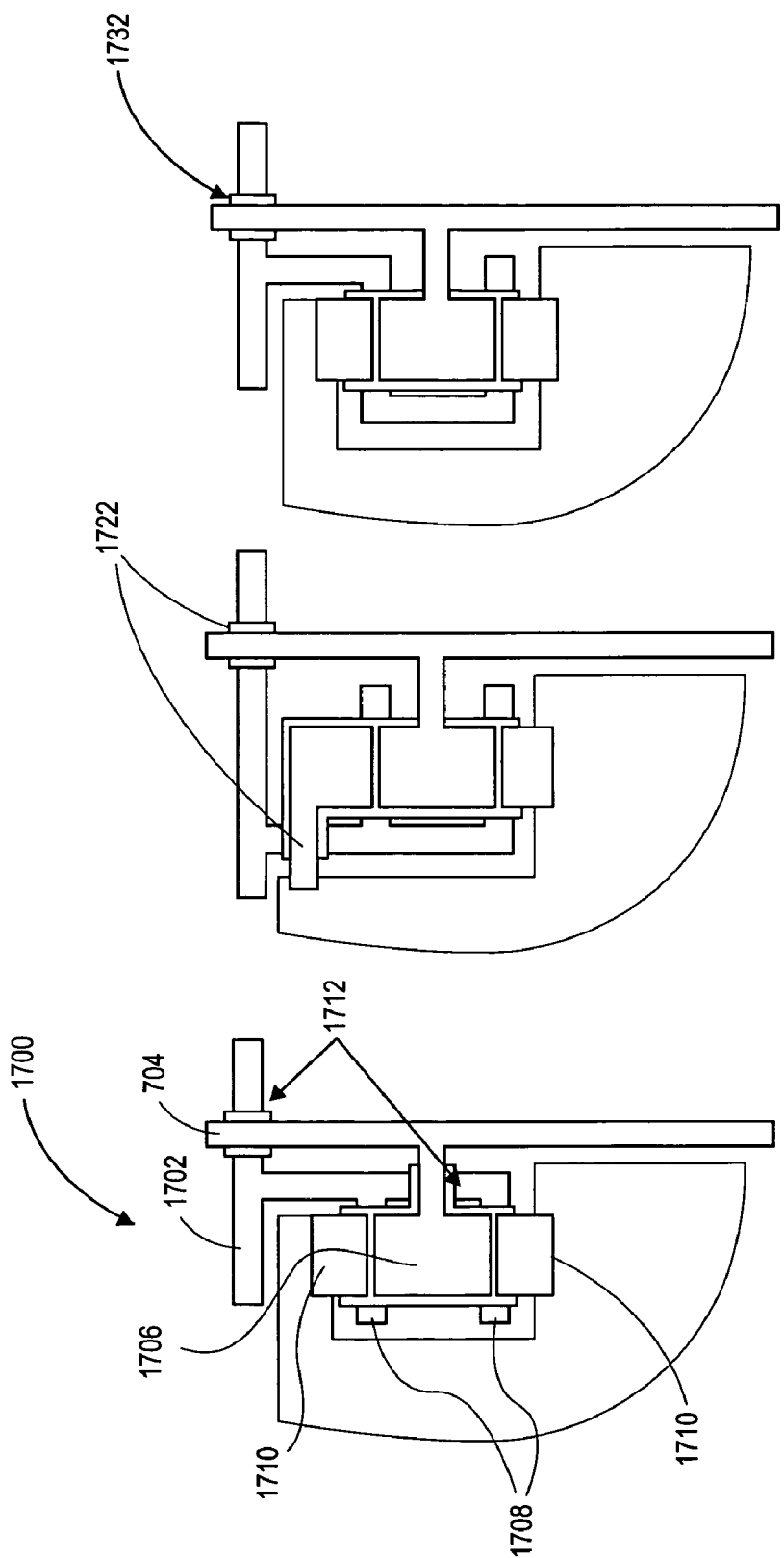

LIQUID CRYSTAL DISPLAY BACKPLANE LAYOUTS AND ADDRESSING FOR NON-STANDARD SUBPIXEL ARRANGEMENTS

RELATED APPLICATIONS

The present application is related to commonly owned (and filed on even date) United States Patent Applications: (1) U.S. Patent Publication No. 2004/0246213 ("the '213 application") entitled "DISPLAY PANEL HAVING CROSSOVER CONNECTIONS EFFECTING DOT INVERSION"; (2) U.S. Patent Publication no. 2004/0246381 ("the '381 application"), entitled "SYSTEM AND METHOD OF PERFORMING DOT INVERSION WITH STANDARD DRIVERS AND BACKPLANE ON NOVEL DISPLAY PANEL LAYOUTS"; (3) U.S. Patent Publication No. 2004/0246278 ("the '278 application"), entitled "SYSTEM AND METHOD FOR COMPENSATING FOR VISUAL EFFECTS UPON PANELS HAVING FIXED PATTERN NOISE WITH REDUCED QUANTIZATION ERROR"; (4) U.S. Patent Publication No. 2004/0246279 ("the '279 application"), entitled "DOT INVERSION ON NOVEL DISPLAY PANEL LAYOUTS WITH EXTRA DRIVERS"; and (5) U.S. Patent Publication No. 2004/0246280 ("the '280 application"), entitled "IMAGE DEGRADATION CORRECTION IN NOVEL LIQUID CRYSTAL DISPLAYS," which are hereby incorporated herein by reference.

BACKGROUND

In commonly owned United States Patent Applications: (1) U.S. Patent Publication No. 2002/0015110 ("the '110 application"), entitled "ARRANGEMENT OF COLOR PIXELS FOR FULL COLOR IMAGING DEVICES WITH SIMPLIFIED ADDRESSING," filed Jul. 25, 2001; (2) U.S. Patent Publication No. 2003/0128225 ("the '225 application"), entitled "IMPROVEMENTS TO COLOR FLAT PANEL DISPLAY SUB-PIXEL ARRANGEMENTS AND LAYOUTS FOR SUB-PIXEL RENDERING WITH INCREASED MODULATION TRANSFER FUNCTION RESPONSE," filed Oct. 22, 2002; (3) U.S. Patent Publication No. 2003/0128179 ("the '179 application"), entitled "IMPROVEMENTS TO COLOR FLAT PANEL DISPLAY SUB-PIXEL ARRANGEMENTS AND LAYOUTS FOR SUB-PIXEL RENDERING WITH SPLIT BLUE SUB-PIXELS," filed Oct. 22, 2002; (4) U.S. Patent Publication No. 2004/0051724 ("the '724 application"), entitled "IMPROVED FOUR COLOR ARRANGEMENTS AND EMITTERS FOR SUB-PIXEL RENDERING," filed Sep. 13, 2002; (5) U.S. Patent Publication No. 2003/0117423 ("the '423 application"), entitled "IMPROVEMENTS TO COLOR FLAT PANEL DISPLAY SUB-PIXEL ARRANGEMENTS AND LAYOUTS WITH REDUCED BLUE LUMINANCE WELL VISIBILITY," filed Oct. 22, 2002; (6) U.S. Patent Publication No. 2003/0090581 ("the '581 application"), entitled "COLOR DISPLAY HAVING HORIZONTAL SUB-PIXEL ARRANGEMENTS AND LAYOUTS," filed Oct. 22, 2002; (7) U.S. Patent Publication No. 2004/0080479 ("the '479 application"), entitled "IMPROVED SUB-PIXEL ARRANGEMENTS FOR STRIPED DISPLAYS AND METHODS AND SYSTEMS FOR SUB-PIXEL RENDERING SAME," filed Jan. 16, 2003, novel sub-pixel arrangements are therein disclosed for improving the cost/performance curves for image display devices and herein incorporated by reference.

These improvements are particularly pronounced when coupled with sub-pixel rendering (SPR) systems and methods further disclosed in those applications and in commonly owned United States Patent Applications: (1) U.S. Patent Publication No. 2003/0034992 ("the '992 application"), entitled "CONVERSION OF A SUB-PIXEL FORMAT DATA TO ANOTHER SUB-PIXEL DATA FORMAT," filed Jan. 16, 2002; (2) U.S. Patent Publication No. 2003/0103058 ("the '058 application"), entitled "METHODS AND SYSTEMS FOR SUB-PIXEL RENDERING WITH GAMMA ADJUSTMENT," filed May 17, 2002; (3) U.S. Patent Publication No. 2003/0085906 ("the '906 application"), entitled "METHODS AND SYSTEMS FOR SUB-PIXEL RENDERING WITH ADAPTIVE FILTERING," filed Aug. 8, 2002; (4) U.S. Patent Publication No. 2004/0196302 ("the '302 application"), entitled "SYSTEMS AND METHODS FOR TEMPORAL SUB-PIXEL RENDERING OF IMAGE DATA" filed Mar. 4, 2003; (5) U.S. Patent Publication No. 2004/0174380 ("the '380 application"), entitled "SYSTEMS AND METHODS FOR MOTION ADAPTIVE FILTERING," filed Mar. 4, 2003; (6) U.S. Patent Publication No. 2004/0174375 ("the '375 application"), entitled "SUB-PIXEL RENDERING SYSTEM AND METHOD FOR IMPROVED DISPLAY VIEWING ANGLES" filed Mar. 4, 2003; (7) U.S. Patent Publication No. 2004/0196297 ("the '297 application"), entitled "IMAGE DATA SET WITH EMBEDDED PRE-SUBPIXEL RENDERED IMAGE" filed Apr. 7, 2003, which are hereby incorporated herein by reference.

BRIEF DESCRIPTION OF THE DRAWINGS

The accompanying drawings, which are incorporated in, and constitute a part of this specification illustrate exemplary implementations and embodiments of the invention and, together with the description, serve to explain principles of the invention.

Figure 9:
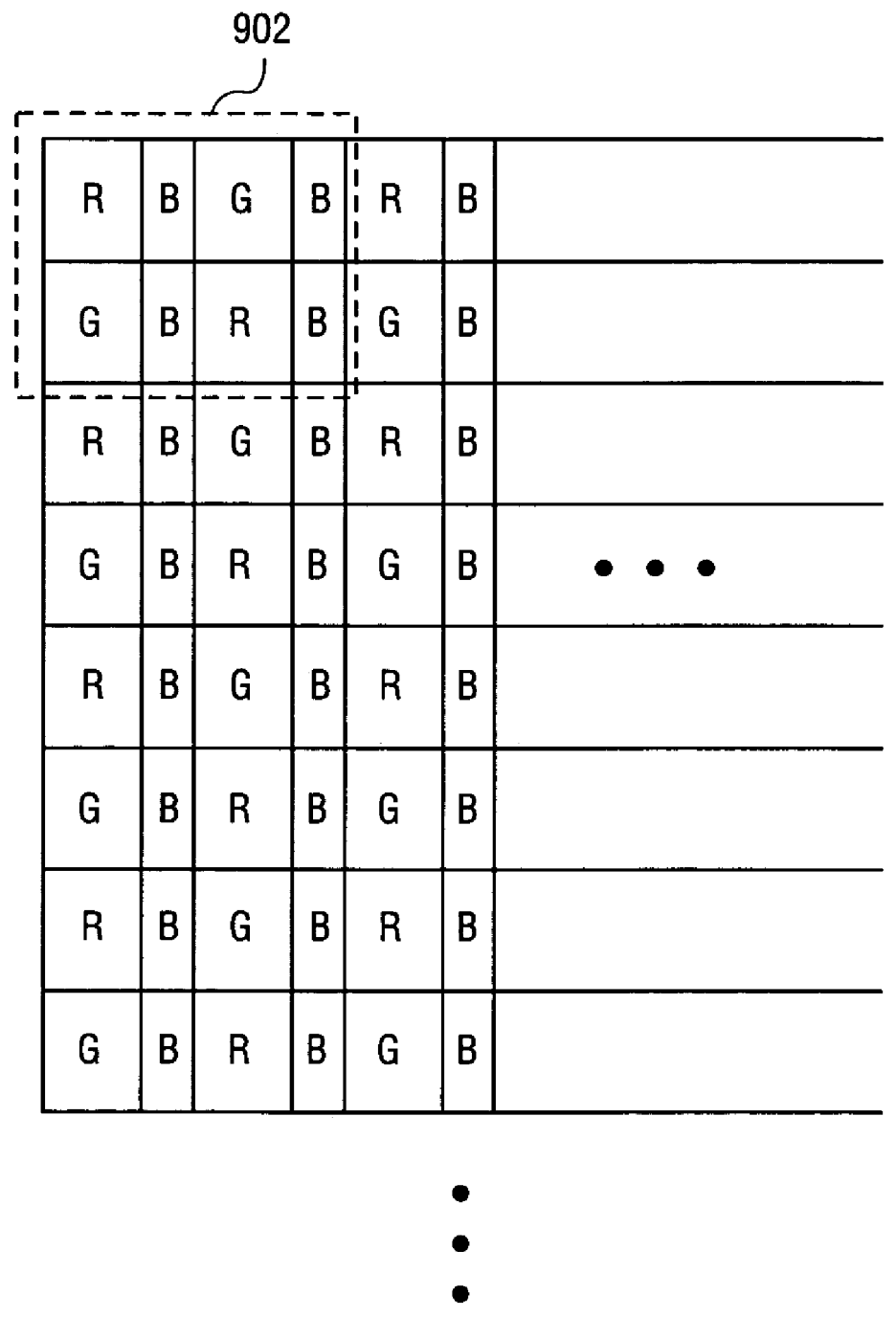

FIGS. 8 through 15 depict a general technique for remapping TFT to a backplane layout so as to effect a desired dot inversion scheme on a panel having a novel subpixel repeating group.

FIGS. 17A, 17B, and 17C show particular TFTs having a double source/drain structure.

DETAILED DESCRIPTION

Reference will now be made in detail to implementations and embodiments, examples of which are illustrated in the accompanying drawings. Wherever possible, the same reference numbers will be used throughout the drawings to refer to the same or like parts.

Figure 1A:
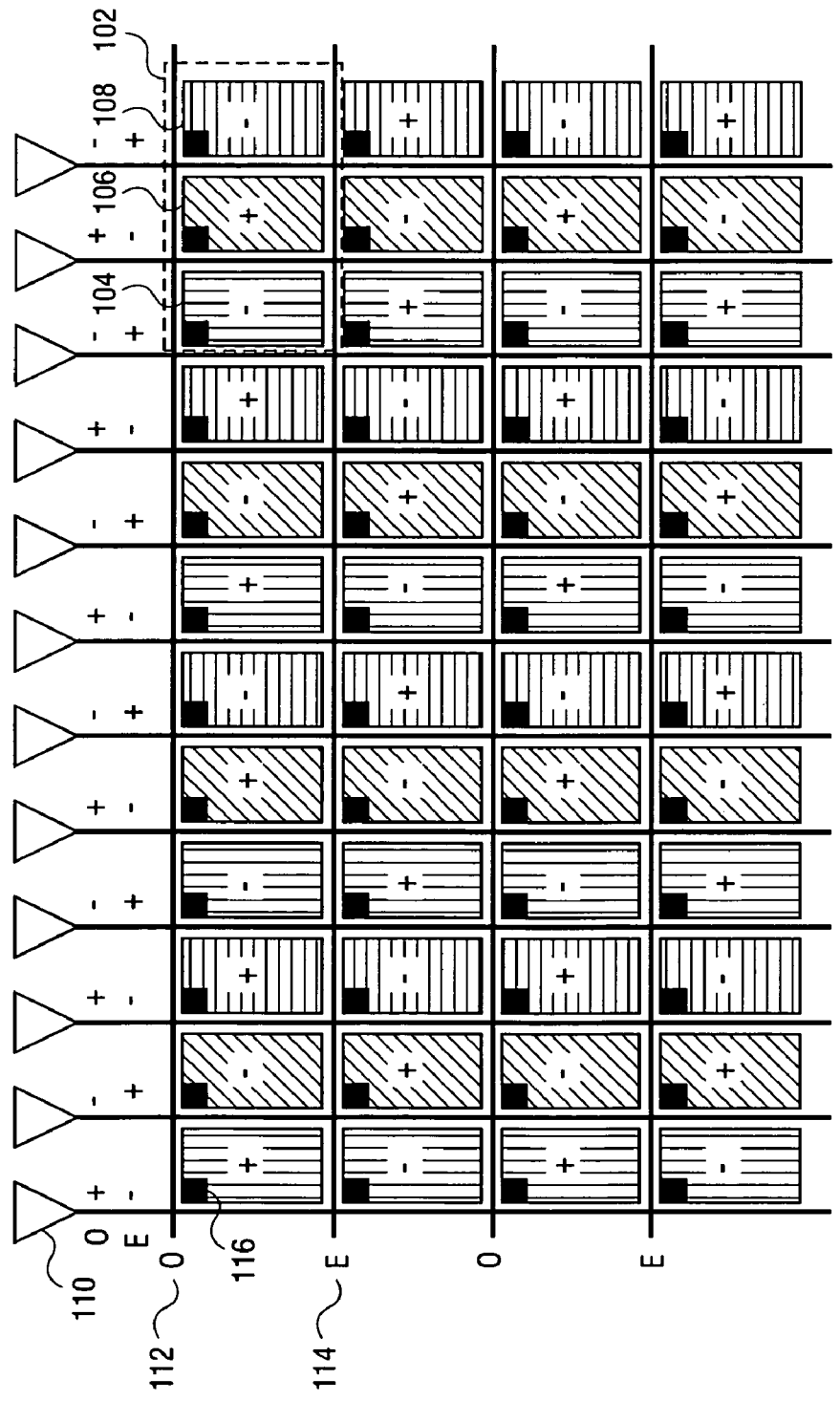
FIG. 1A shows a conventional RGB stripe panel with 1×1 dot inversion.

FIG. 1A shows a conventional RGB stripe structure on panel 100 for an Active Matrix Liquid Crystal Display (AMLCD) having thin film transistors (TFTs) 116 to activate individual colored subpixels—red 104, green 106 and blue 108 subpixels respectively. As may be seen, a red, a green and a blue subpixel form a repeating group of subpixels 102 that comprise the panel.

As also shown, each subpixel is connected to a column line (each driven by a column driver 110) and a row line (e.g. 112 and 114). In the field of AMLCD panels, it is known to drive the panel with a dot inversion scheme to reduce crosstalk and flicker. FIG. 1A depicts one particular dot inversion scheme—i.e. 1×1 dot inversion—that is indicated by a "+" and a "−" polarity given in the center of each subpixel. Each row line is typically connected to a gate (not shown in FIG. 1A) of TFT 116. Image data—delivered via the column lines—are typically connected to the source of each TFT. Image data is written to the panel a row at a time and is given a polarity bias scheme as indicated herein as either ODD ("O") or EVEN ("E") schemes. As shown, row 112 is being written with ODD polarity scheme at a given time while row 114 is being written with EVEN polarity scheme at a next time. The polarities alternate ODD and EVEN schemes a row at a time in this 1×1 dot inversion scheme.

Figure 1B:
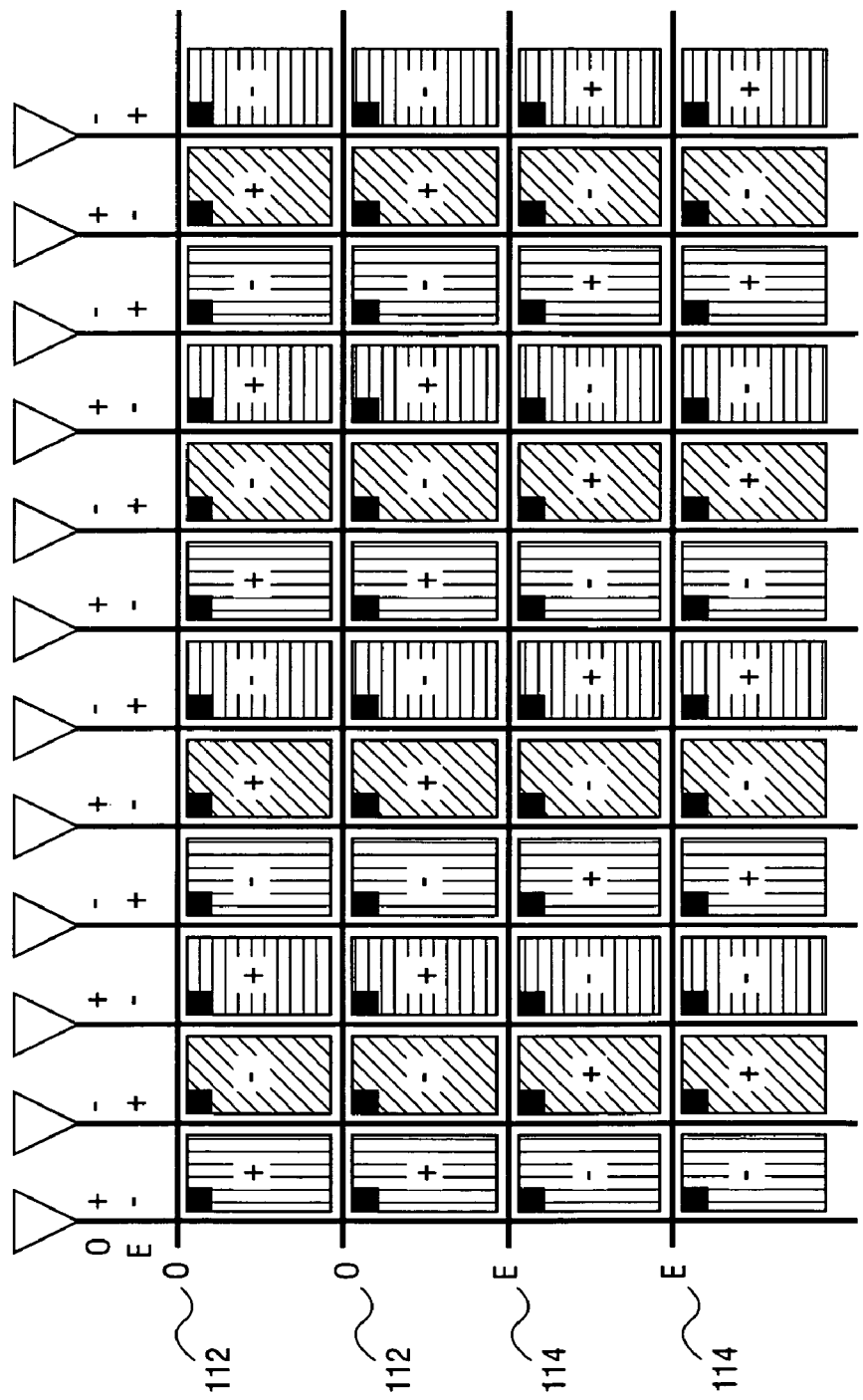
FIG. 1B shows a conventional RGB stripe panel with 1×2 dot inversion.

FIG. 1B depicts another conventional RGB stripe panel having another dot inversion scheme—i.e. 1×2 dot inversion. Here, the polarity scheme changes over the course of two rows—as opposed to every row, as in 1×1 dot inversion. In both dot inversion schemes, a few observations are noted: (1) in 1×1 dot inversion, every two physically adjacent subpixels (in both the horizontal and vertical direction) are of different polarity; (2) in 1×2 dot inversion, every two physically adjacent subpixels in the horizontal direction are of different polarity; (3) across any given row, each successive colored subpixel has an opposite polarity to its neighbor. Thus, for example, two successive red subpixels along a row will be either (+,−) or (−,+). Of course, in 1×1 dot inversion, two successive red subpixels along a column with have opposite polarity; whereas in 1×2 dot inversion, each group of two successive red subpixels will have opposite polarity. This changing of polarity decreases noticeable visual defects that occur with particular images rendered upon an AMLCD panel.

Figure 2:
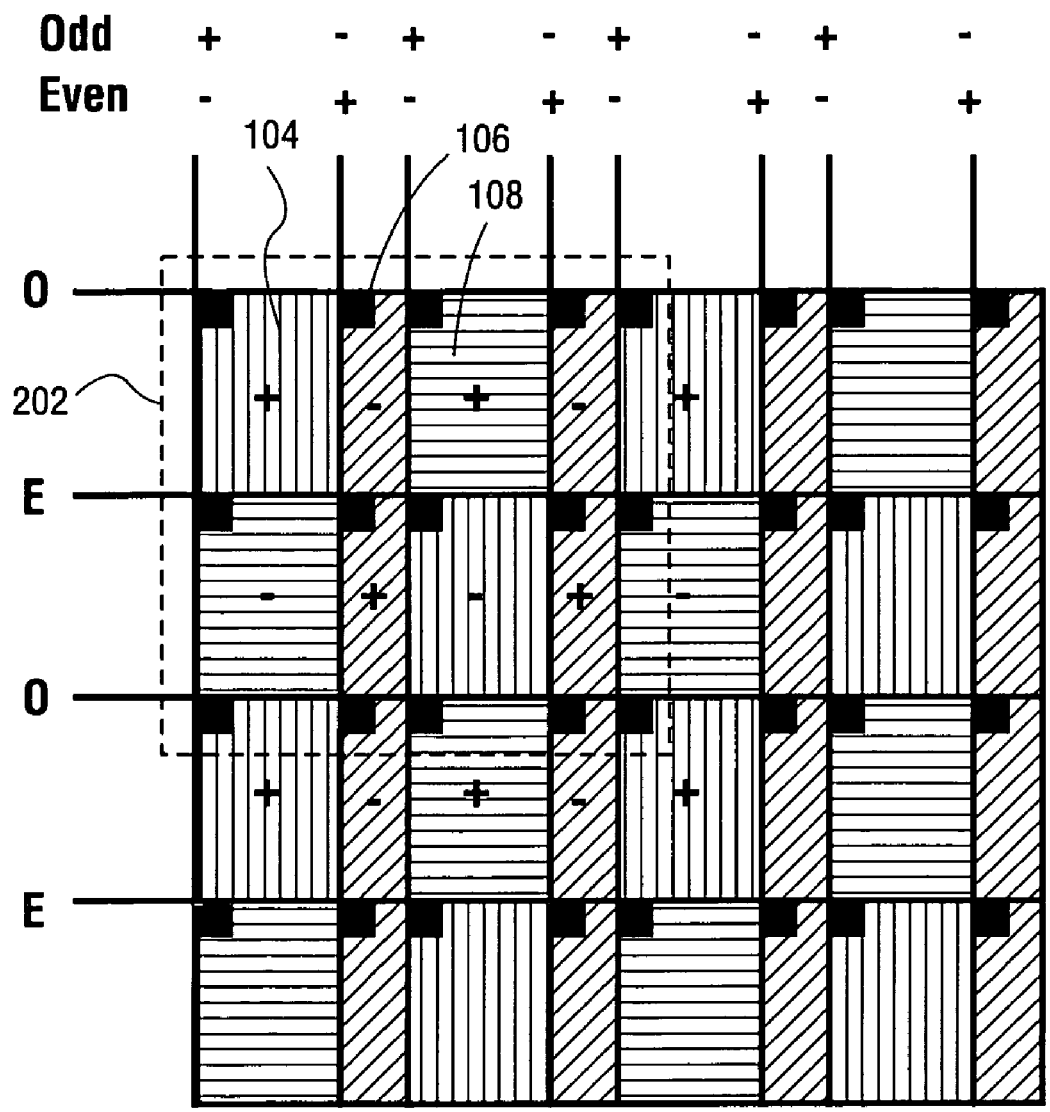
FIG. 2 shows a panel having a novel subpixel repeating group of even number of subpixels in a first (row) direction with a conventional 1×1 dot inversion scheme.

FIG. 2 shows a panel comprising a repeat subpixel grouping 202, as further described in the '225 application. As may be seen, repeat subpixel grouping 202 is an eight subpixel repeat group, comprising a checkerboard of red and blue subpixels with two columns of reduced-area green subpixels in between. If the standard 1×1 dot inversion scheme is applied to a panel comprising such a repeat grouping (as shown in FIG. 2), then it becomes apparent that the property described above for RGB striped panels (namely, that successive colored pixels in a row and/or column have different polarities) is now violated. This condition may cause a number of visual defects noticed on the panel—particularly when certain image patterns are displayed. This observation also occurs with other novel subpixel repeat grouping—for example, the subpixel repeat grouping in FIG. 1 of the '179 application—and other repeat groupings that are not an odd number of repeating subpixels across a row. Thus, as the traditional RGB striped panels have three such repeating subpixels in its repeat group (namely, R, G and B), these traditional panels do not necessarily violate the above noted conditions. However, the repeat grouping of FIG. 2 in the present application has four (i.e. an even number) of subpixels in its repeat group across a row (e.g. R, G, B, and G). It will be appreciated that the embodiments described herein are equally applicable to all such even modulus repeat groupings.

Figure 3:
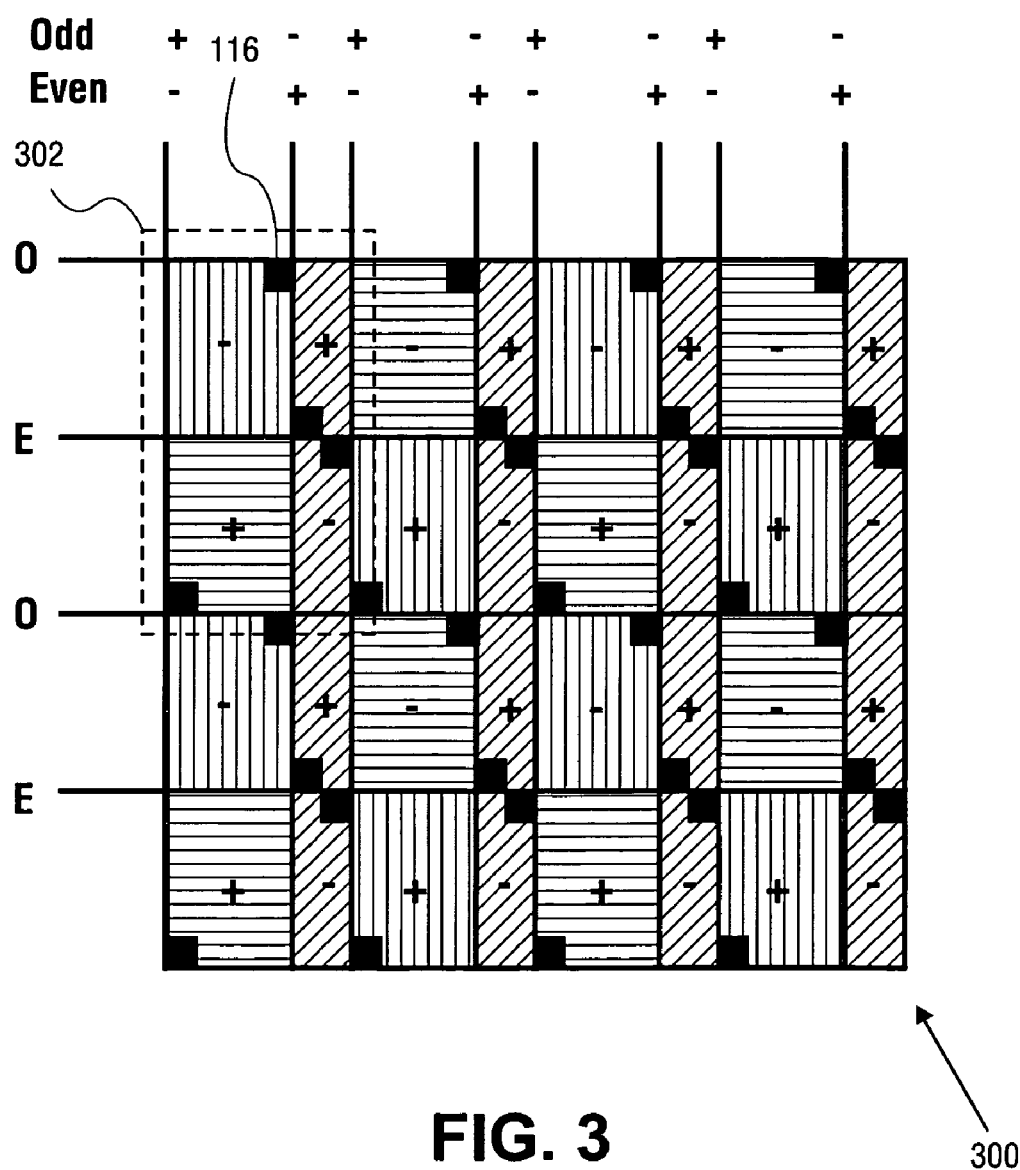
FIG. 3 shows the panel of FIG. 2 with a novel TFT backplane layout.
Figure 4:
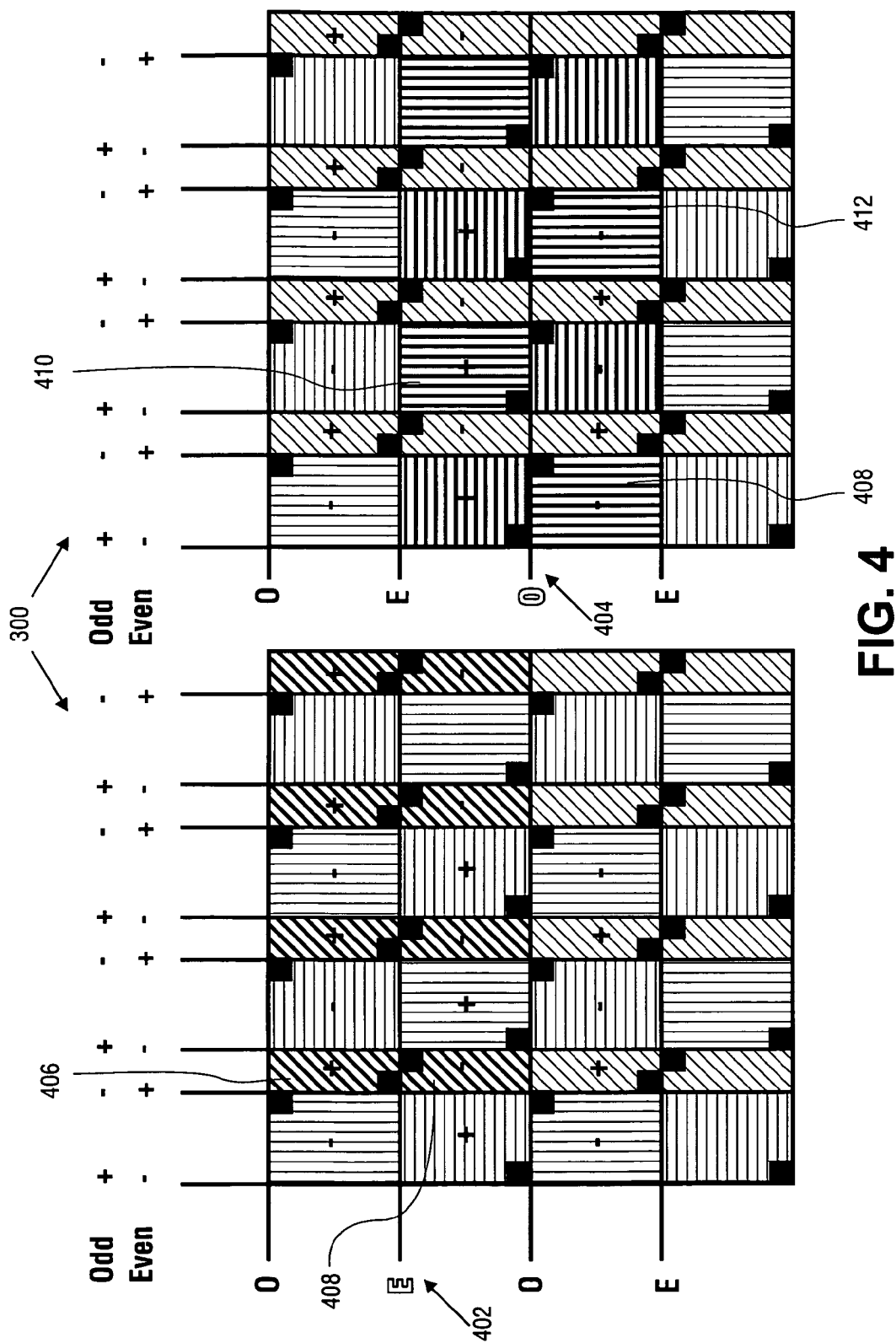
FIG. 4 depicts the operation of the panel of FIG. 3 during two row-writes.

In order to affect improved performance, several embodiments are herein described. A first embodiment of an AMLCD panel 300 is shown in FIG. 3. Box 302 encloses four TFTs 116 that drive their associated four colored subpixels. As may be seen, the gates of each TFT 116 are connected to a row line in such a manner as to have same colored subpixels—successively staggered—across each row affect opposite polarity. This effect is shown in FIG. 4, for example, with red subpixels 408, 410, and 412, etc. receiving (−, +, −, . . . ) polarities during a row write to line 404. The same effect is shown for blue subpixels across line 404. One possible benefit of this condition is that any parasitic capacitances (for example, as between the gate and the drain of the TFT, $C_{GD}$, and as between the pixel and the gate line, $C_{G-Pixel}$) that occur across a row/gate line with are minimized by having the same number of "+" and "−" polarities connected to the row/gate line.

It is further seen in FIG. 3 that the TFTs 116 in repeating group 302 are formed at the intersection of a pair of row and column lines at a given quadrant of the subpixel. For example, the upper red subpixel in group 302 has its TFT formed in the first quadrant; while the upper green subpixel has its TFT formed in the third quadrant. To affect a dot inversion scheme on a subpixel repeating group of an even number of subpixels in a row or column direction, one embodiment is to find a suitable remapping of the TFT backplane from their usual placement in one quadrant, so that the remapping may use any number of quadrants greater than one.

FIG. 4 depicts how panel 300 operates over the course of two successive row-writes. During the first row-write (panel 300 on the left hand side), row 402 sends an active gate signal down to the connected TFTs and their associated subpixels (shown in BOLD hatching) on an EVEN cycle. In this case, all of the green subpixels in two rows are activated. However, as may be seen, the TFTs have been advantageously replaced so that two bordering green TFTs in the vertical direction has opposite polarities. So, for example, green subpixel 406 has a "+" polarity; while green subpixel 408 has a "−" polarity.

Additionally, as may be seen, the polarities of all of the green subpixels connected to row line 402 are balanced—i.e. the number of "+" polarity green subpixels equals the number of "−" polarity green subpixels.

During the next row-write (as shown in panel 300 on the right hand side), row line 404 sends an active gate signal to its connected TFTs and their associated subpixels (also shown in BOLD hatching) on an ODD cycle. Again, given the replacement of the TFTs, each two adjacent subpixels in the vertical direction have opposite polarity. Additionally, as described above, same colored subpixels that are successively staggered along a row line are of opposite polarity.

Figure 5:
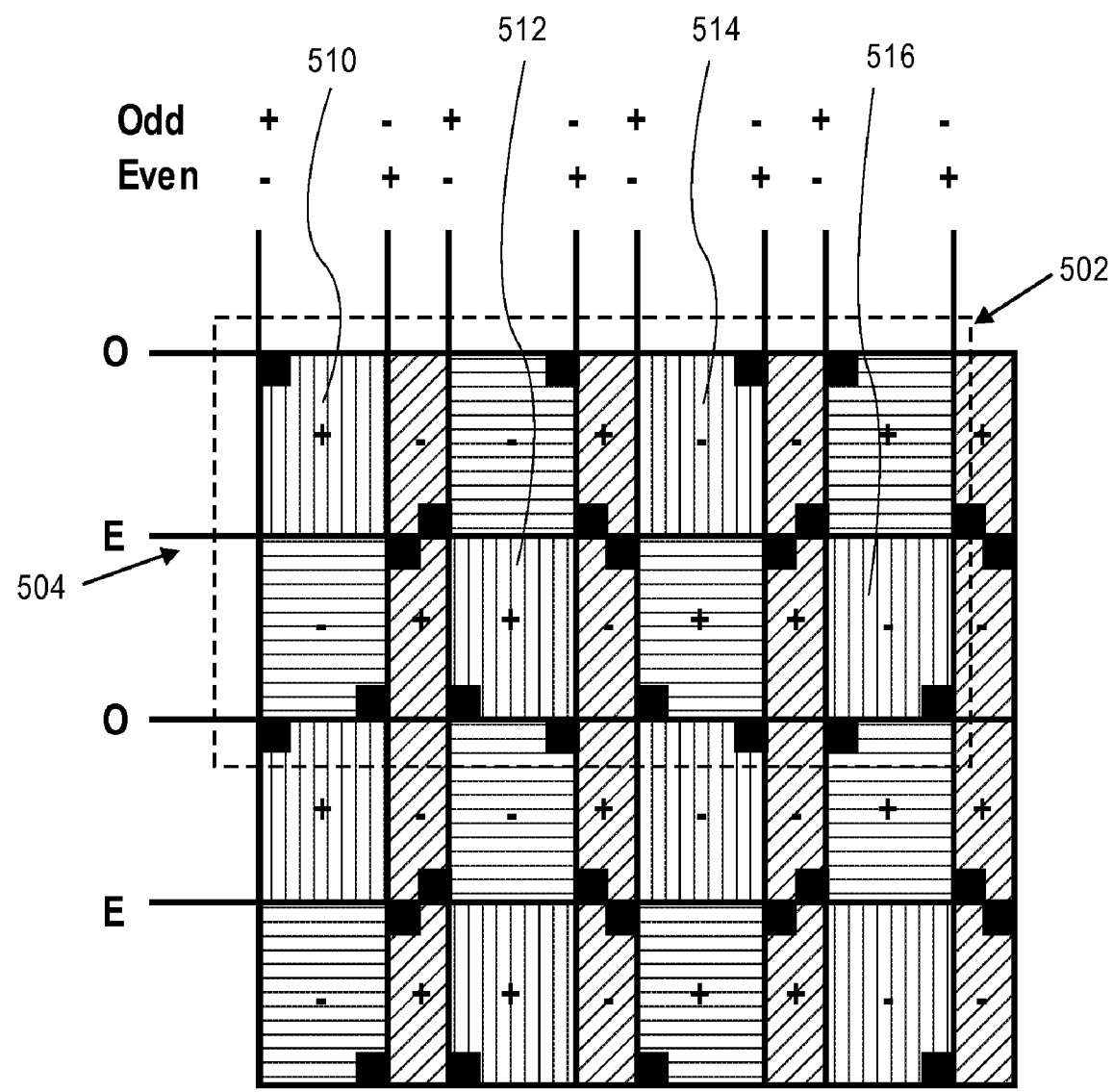
FIG. 5 depicts another embodiment of a TFT backplane layout with a 1×1 dot inversion scheme.

Yet another embodiment comprising a TFT replacement (i.e. off from the traditional manner of consistently placing TFTs in a single position relative to the subpixels—such as the upper left hand corner) is shown in FIG. 5. The repeat grouping of TFTs in this arrangement are shown as block 502. With this arrangement, similar corrective polarity conditions as noted for FIGS. 3 and 4 are found with the TFT placement of FIG. 5. For example, along row/gate line 504, every two red subpixels alternate polarity—e.g. red subpixels 510 and 512 have "+" polarity; while red subpixels 514 and 516 have "−" polarity. As will be discussed in greater detail below, there are a number of different TFT placements that will achieve the same effects. Each such TFT placement (or TFT "remapping") is contemplated within the scope of the present invention and, as such, the present invention should not be limited to any particular TFT placement or remapping.

Figure 6:
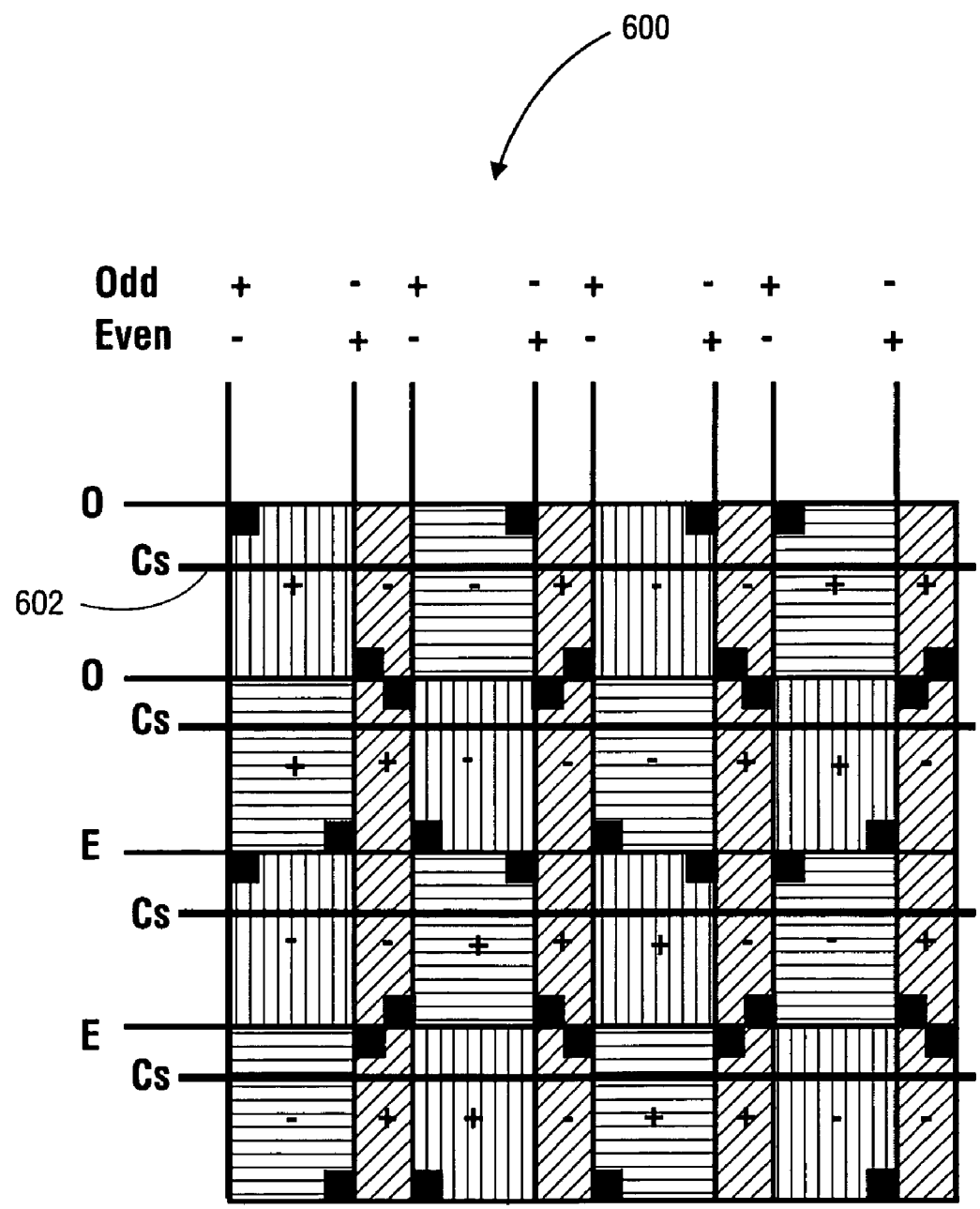
FIG. 6 depicts the panel of FIG. 5 with a 1×2 dot inversion scheme.

FIG. 6 is yet another embodiment of TFT remapping on panel 600 that may take into account additional parasitic capacitance effects between pixel and the $C_S$ electrode 602. In this case, two successive row/gate lines are driven by a given polarity scheme (O or E). The polarity of each subpixel is shown in its center. It will be noted that along any given row (and hence along a given $C_S$ line), successive same colored subpixels alternate polarity.

Figure 7:
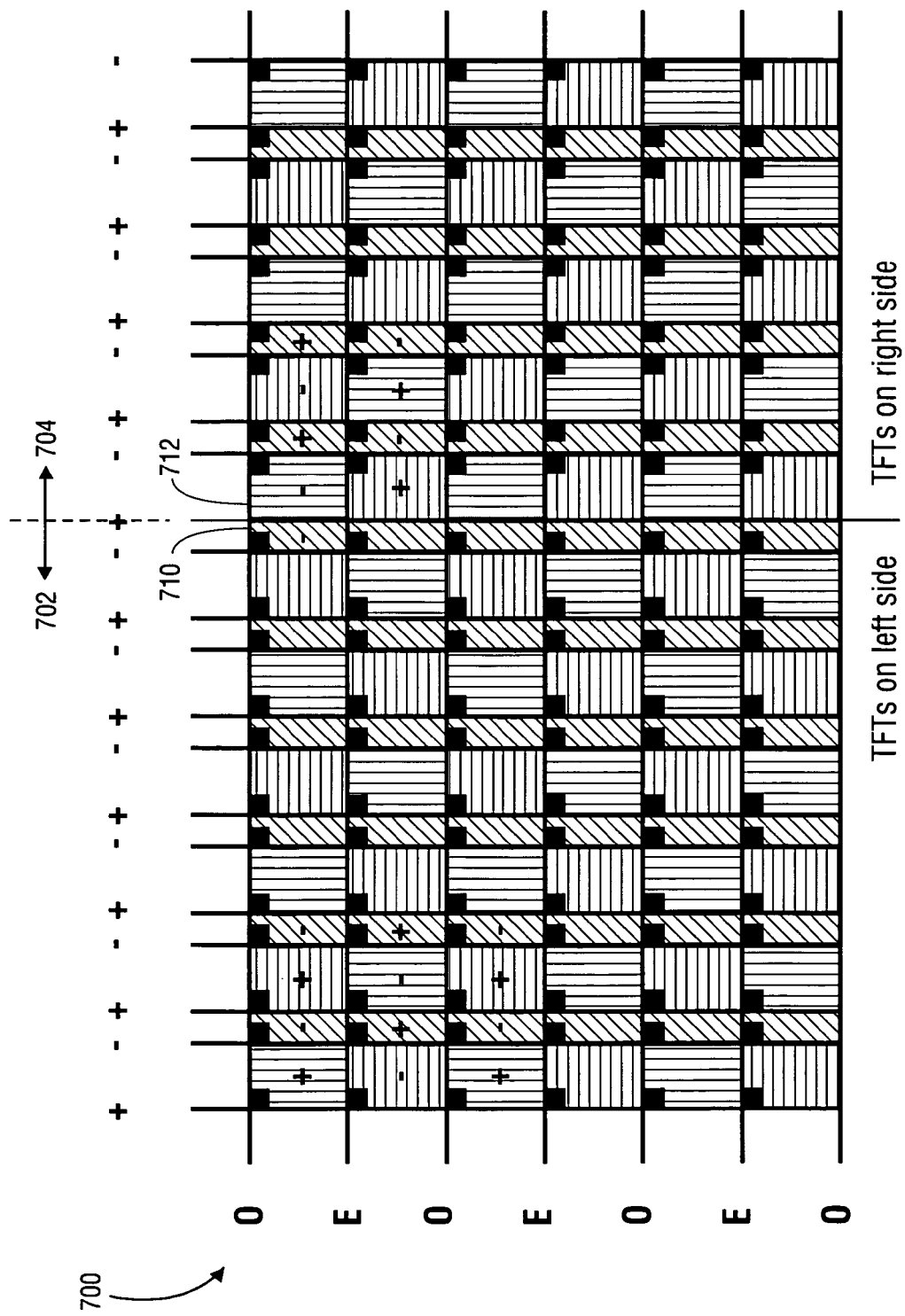
FIG. 7 depicts a panel wherein at least two regions are defined with TFTs constructed in the a first region of a pixel and TFTs constructed in a second region of a pixel.
Figure 8:
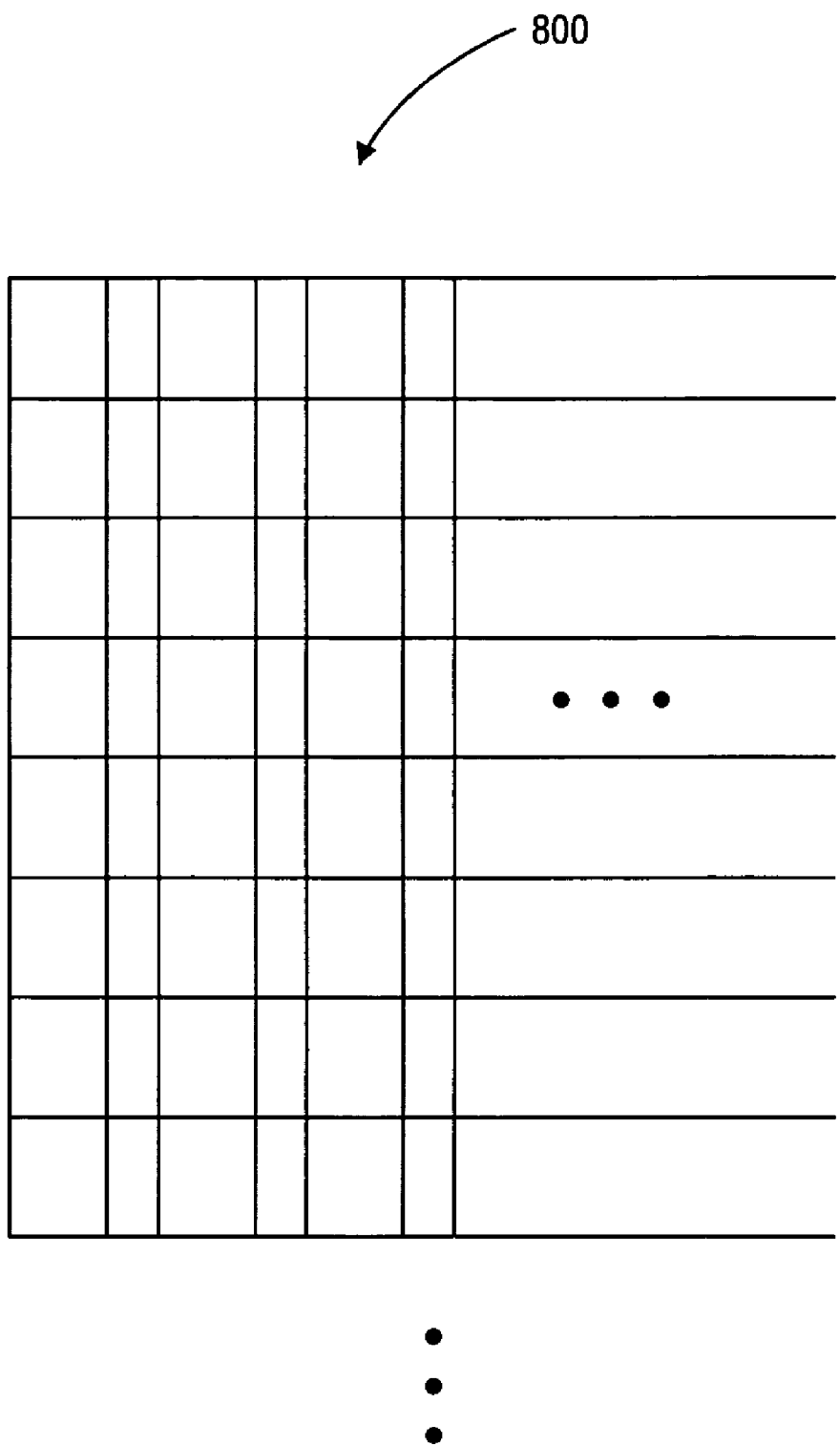
Figure 10:
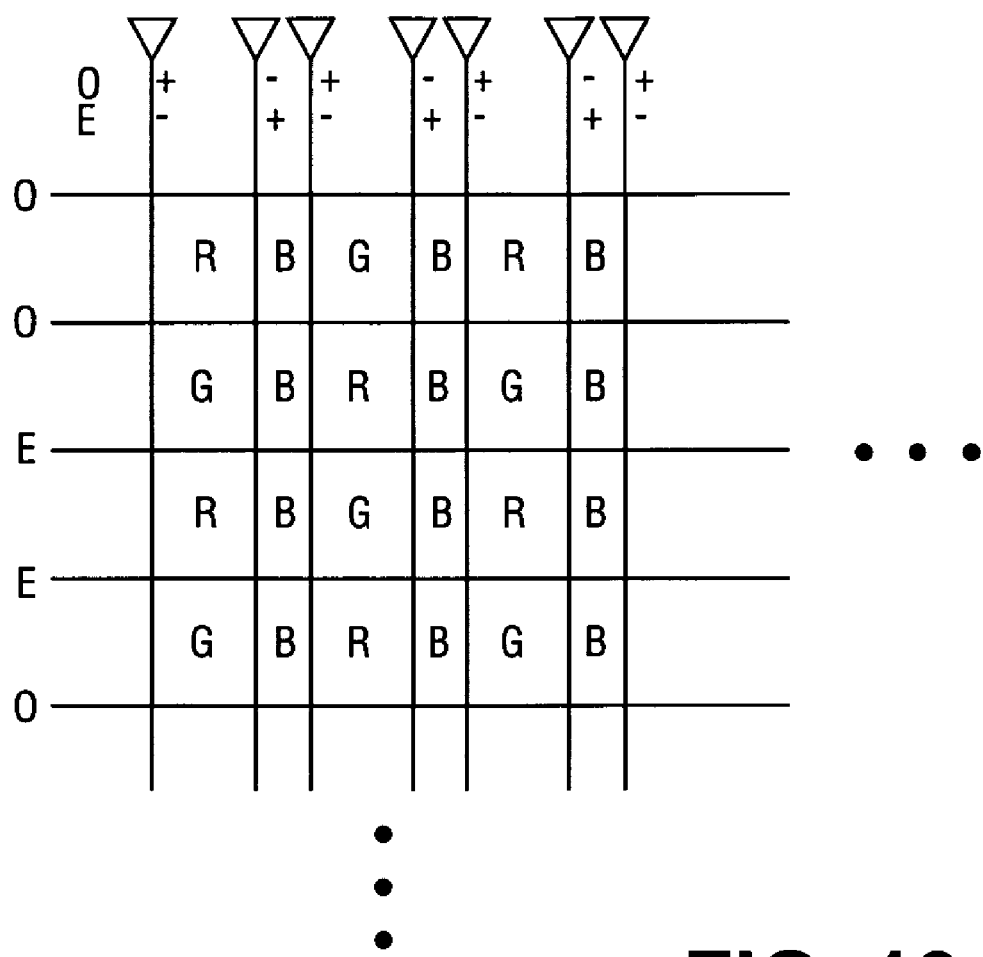

Another TFT remapping that may produce similar beneficial effects is shown in FIG. 7. In this case, the panel 700 is partitioned into sections (e.g. 702, 704) that place the TFTs of their associated subpixels in corners such that the polarity at the two columns at the partition line repeats. Thus, for example, column 710 and 712 have the same polarities of subpixels going down the respective columns. If the number of subpixels across a row defining a given partition is small enough, the accumulated parasitic capacitances in that partition may be sufficiently below a visually detectable (or at least manageable) level. This partitioning across a panel might occur a number of times in order to keep those parasitics at a low enough level. As an alternative embodiment, this panel could have a 1×2 dot inversion scheme—thereby effectively solving vertical crosstalk (i.e. whereby same colored subpixels have same polarity in a given column).

FIGS. 8 through 15 outline a general procedure for developing many different embodiments of TFT remappings that may effect reduced parasitic capacitance in an panel having even modulus for a subpixel repeating group. Starting with a basic grid 800 of FIG. 8, a repeating subpixel grouping 902 is placed upon the grid in FIG. 9. It will be appreciated that, as noted above, any repeating group would suffice here; but preferably one with an even number of subpixels across a row. A dot inversion scheme is selected in FIG. 10—in this case, a 1×2 dot inversion scheme is selected with two polarity schemes or "phases"—O and E. Additionally, these two phases are repeated for every two row/gate lines—O, O, E, E, etc. If 1×1 dot inversion were desired, then the phases would alternate every row/gate line.

Figure 11:
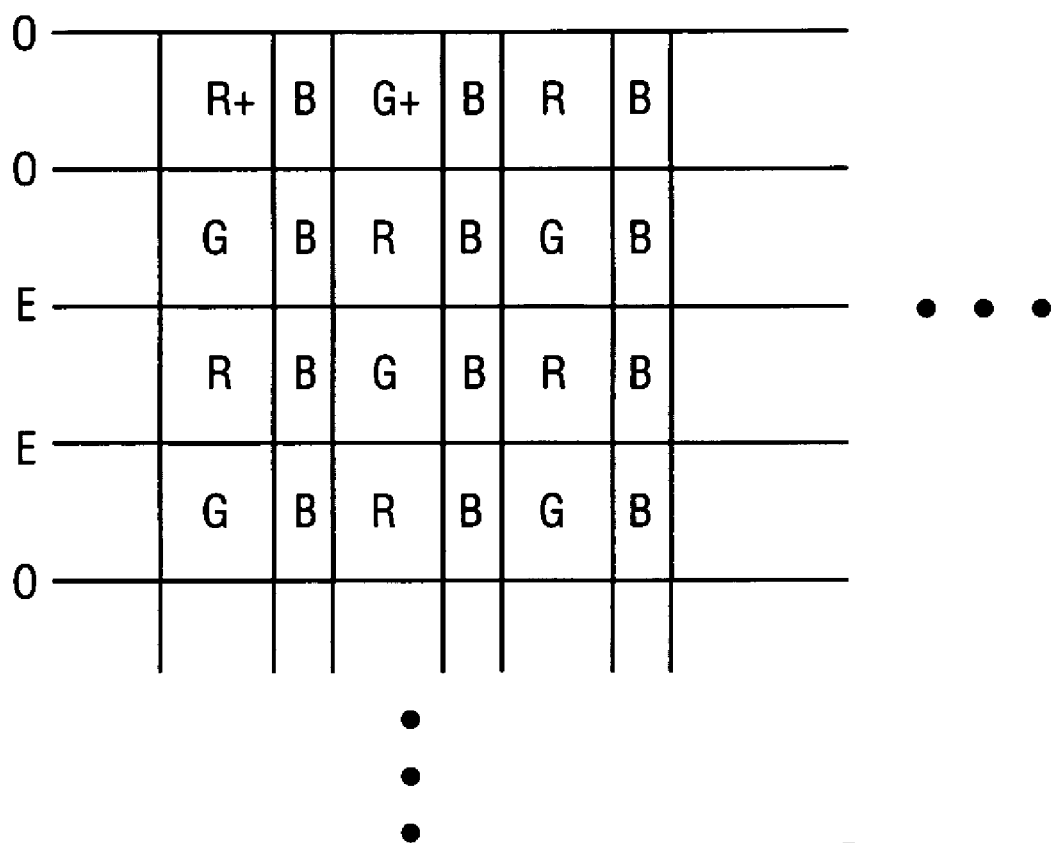

Any symmetries in the repeat grouping are now to be considered. For example, in FIG. 11, it is noted that every other column is a line of blue subpixels. Thus, a possible symmetry to consider is in the other columns of alternating red and green subpixels. Now, consider all possible combinations of polarities for the first two subpixel in the columns of interest. In FIG. 11 for example, the first two red and green subpixels could assume a set of four possible polarity values. In general, if the first N subpixels in relevant rows or columns are considered, then $2^N$ combinations of polarities may or should be considered.

Figure 12:
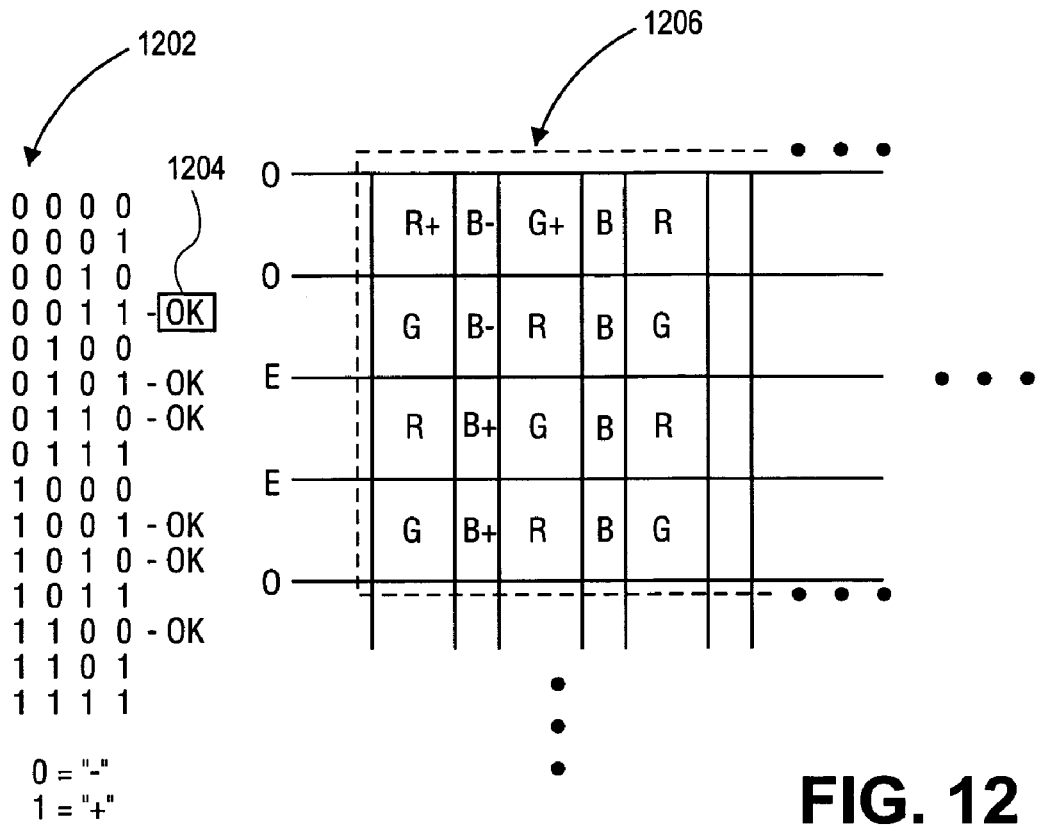

Other symmetries may also be taken into consideration. In FIG. 12, the polarities in one of the columns of same colored subpixels are considered. A listing of possible polarities are shown in list 1202 for the second column of blue subpixels—and the first four such blue subpixels in the column are considered. The list could be exhaustive of the possibilities of polarities and certainly another number other than four may be considered. As it may be advantageous to balance the polarities down a given column—all of those possibilities with a balanced number of polarities are noted as "OK". One OK combination 1204 is selected, solely for exemplary purposes, for grid 1206.

Figure 13:
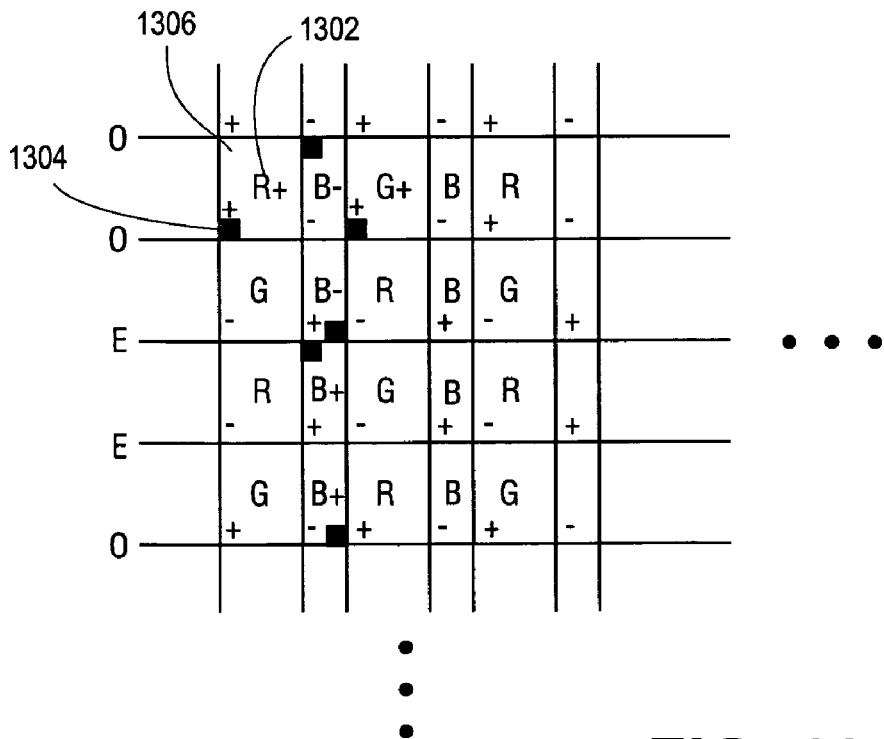

FIG. 13 shows an initial selection of TFT placements on the grid. Initially, for optional visual aiding, the polarities accorded to each intersection of a row/gate line and a column/data line are placed on the grid—as either a "+" or a "−". It is noted that any TFT placed in any quadrant around an intersection point will effect the same polarity on its associated subpixel. As for the subpixels in FIG. 12 that have been assigned a polarity, there is a degree of freedom in selecting which intersection to place the TFT. For example, red subpixel 1302 has been assigned a "+" polarity and there are two possible intersections 1304 and 1306 at which to place its associated TFT. For exemplary purposes, the TFT is selected to be placed at intersection 1304. Of course, the placement of TFTs could be affected by many possible factors—for example, the desire to minimally impact design rules, to minimize ill effect (e.g. parasitic capacitances), etc. As may be seen, the other TFTs for the polarity-assigned subpixels in FIG. 13 have also been placed—as one possible embodiment and selection thereof. Of course, other embodiments/selections are also possible.

Figures 14, 15:
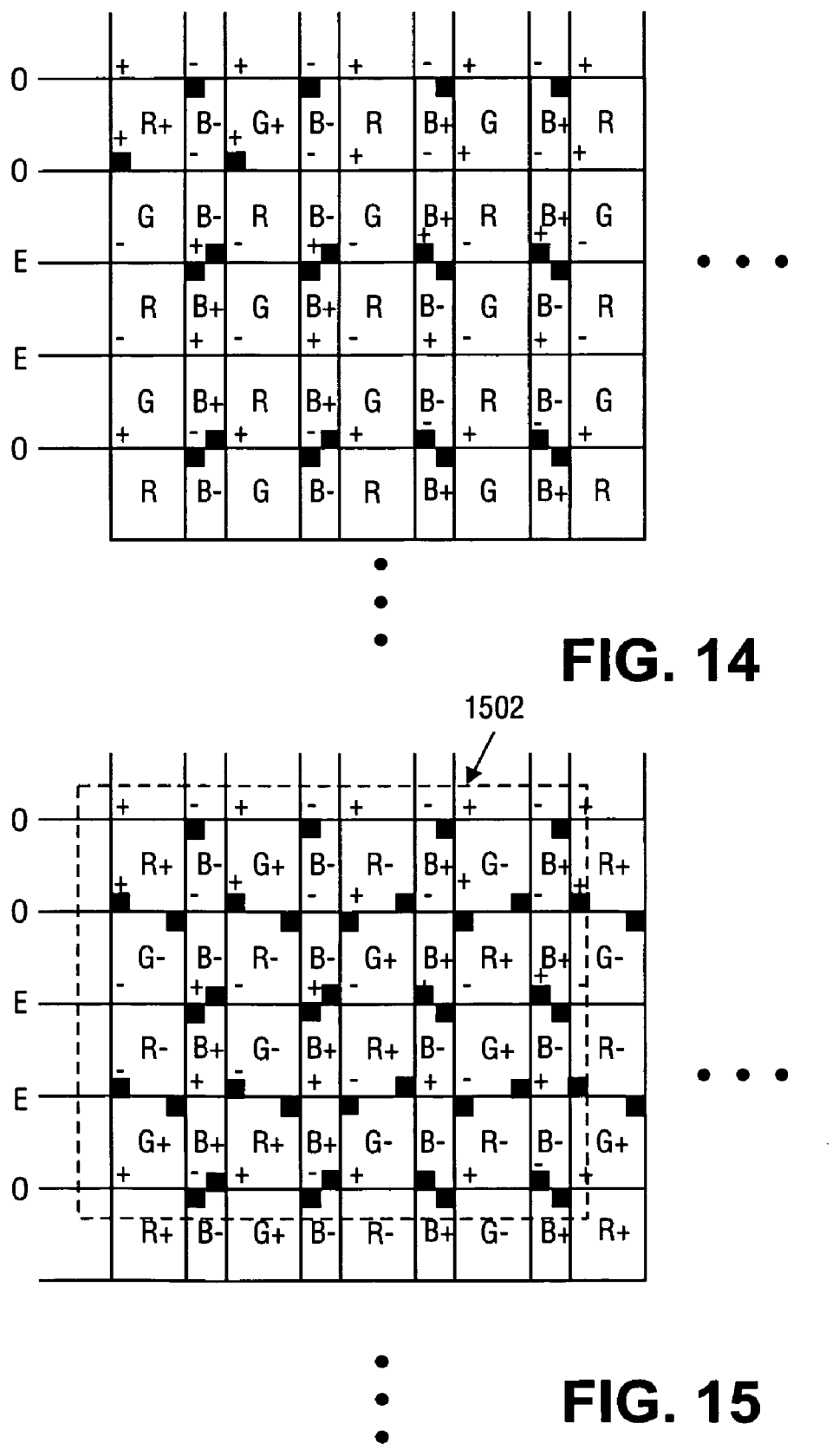

FIG. 14 extends this process of TFT placement to the remaining blue subpixels on the grid. Although there are other selections possible, this particular selection was made with the idea of balancing the polarities across any given row. As may be seen, the blue subpixels polarities balance out across any given row/gate line. FIG. 15 fills in the remaining red and green subpixel TFT placements. One possible goal is to assign the remaining TFTs in a grouping that may be repeated across the entire panel to form the backplane. One such repeat grouping is 1502 in FIG. 15. Grouping 1502 is an 8×4 subpixel grouping that seeks to balance polarities across all subpixels in the row and column directions, as well as balancing polarities within each single color subpixel sub-grid in the row and column directions. It will be appreciated that by following the general procedure outlined above and exploiting the various degrees of freedom in design choice, many possible TFT placements or remappings are possible to develop a suitable TFT grid.

Figures 16A, 16B:
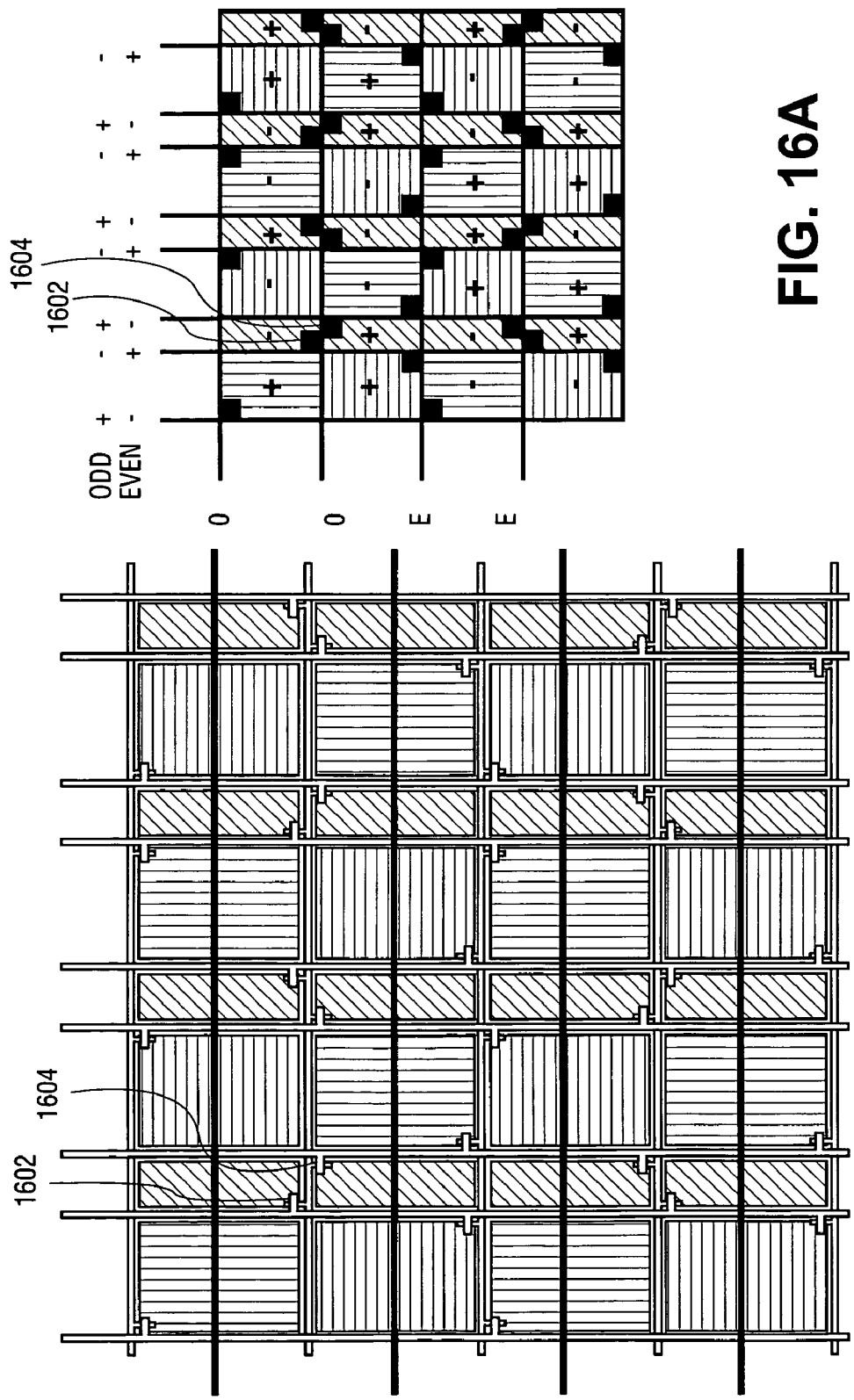
FIGS. 16A and 16B show a particular embodiment of a TFT backplane layout on a panel having a novel subpixel repeating group with a 1×2 dot inversion scheme.

FIG. 16A shows one possible TFT remapping grid effecting a 1×2 dot inversion scheme. FIG. 16B shows how the remapping grid might be implemented on a panel with a little greater detail. TFT 1602 and 1604—with TFT 1602 implemented at the bottom of a pixel area and TFT 1604 at the top of a pixel area—are possibly susceptible to some uneven effects that might be introduced during the manufacturing process. For example, if the gate metal or pixel electrode masks are translated upwards during manufacturing, then it may be possible for reduced parasitic capacitance for TFT 1602 and its associated pixel and for increased parasitic capacitance for TFT 1604 and its associated pixel. If the errors in parasitics are out of tolerance bounds, then the yield of manufacturing such panels with unconventional TFT remappings might decrease. Thus, it may be desirable to redesign the TFT structure as designed below in order to abate any uneven effects as noted above.

Figure 16C:
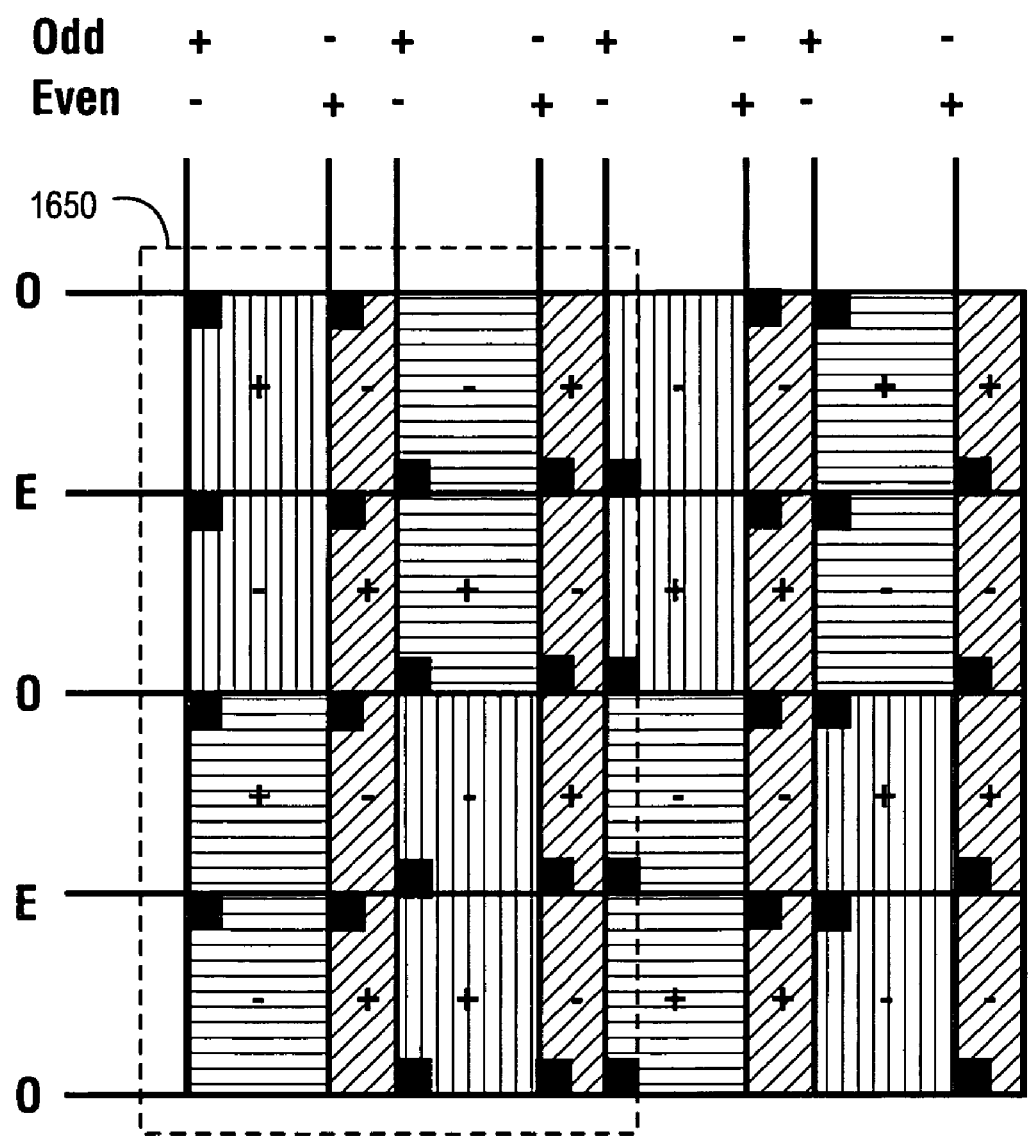
FIG. 16C shows yet another embodiment of a TFT backplane layout with a novel subpixel repeating group affecting a 1×2 dot inversion scheme.

FIG. 16C shows another embodiment of a panel having a novel subpixel repeating group 1650. In this group, the pattern looks like:

R G B G
R G B G
B G R G
B G R G

When a 1×1 dot inversion scheme is applied to this repeat grouping, vertical crosstalk problems are solved. Additionally, all the TFTs may be place on the same side of the pixel structure—which may reduce some parasitic effects or imbalances.

One known attempt to correct for TFT misalignments and any associated increase in parasitic capacitance is found in U.S. Pat. No. 5,191,451 to Katayama et al. FIG. 17A depicts the "double TFT" arrangement 1700 of the '451 patent. Source line 1704 connects to the TFT via source electrode 1706. Two gate electrodes 1708 are connected to gate line 1702. Two drain electrodes 1710 connect to the pixel and are formed such that the two gate electrodes 1708 affect conduction from the source electrode to the drain electrodes when activated. It is noted that there are two crossover regions 1712 that are connected to TFT may produce additional parasitic capacitance between the gate and the source. As discussed in the '451 patent, any vertical misalignment of the TFT placement is somewhat corrected by this double TFT arrangement as is discussed therein. FIGS. 17B and 17C provide different alternative embodiments for the double TFT structure to the one shown in FIG. 17A. This structure will enable reduced source to gate capacitance, which can cause crosstalk in certain images. The gate to drain crossover will be less damaging to image quality. One advantage of the embodiment of FIG. 17C is that there is only one crossover 1732 that may reduce parasitic capacitance.

Figure 18:
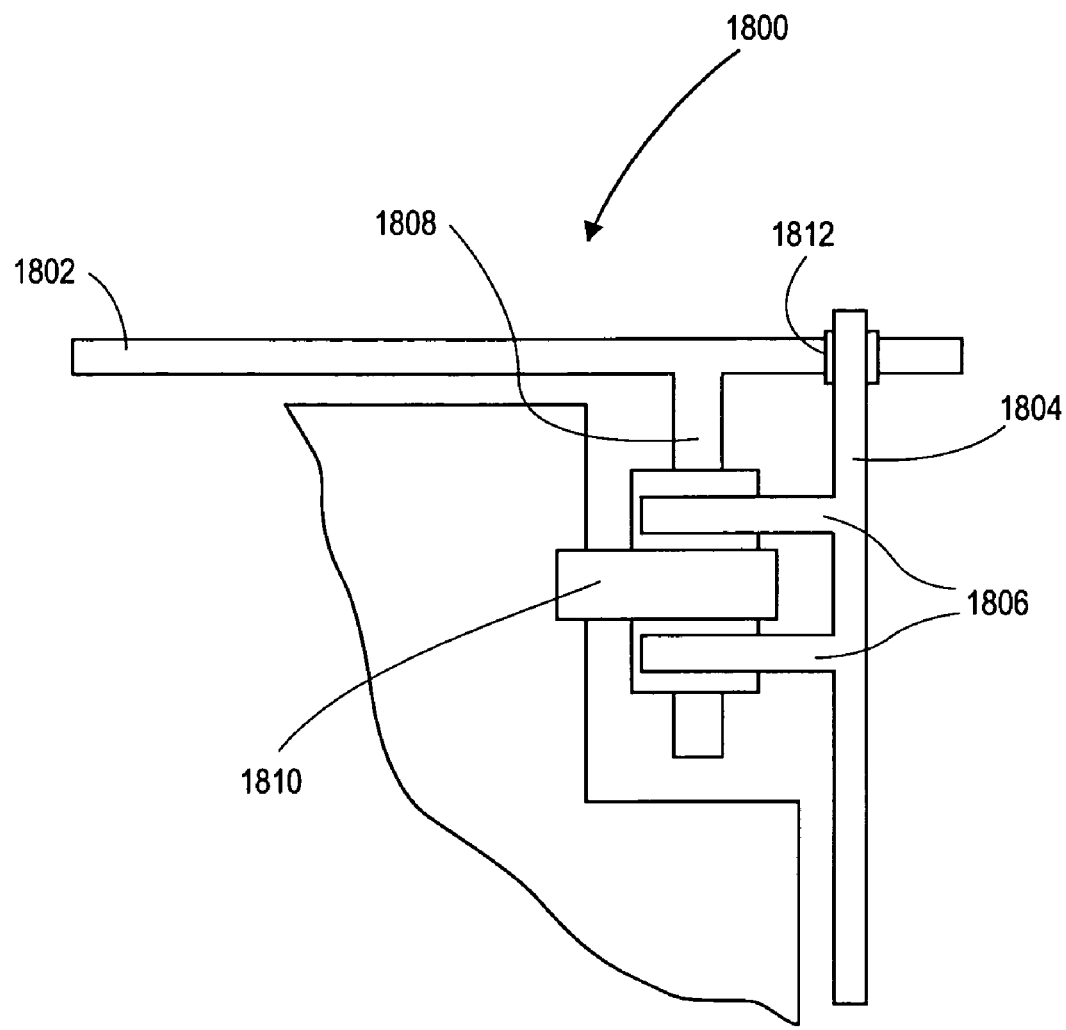
FIG. 18 shows a TFT with a double gate structure.

Another manner of reducing the ill effects of TFT misalignment is shown in U.S. Pat. No. 5,097,297 to Nakazawa. FIG. 18 depicts a TFT 1800 made in the manner taught in the '297 patent. As may be seen in FIG. 18, gate line 1802 delivers the gate signal to gate electrode 1808. Source line 1804 sends image data to source electrodes 1806. When the gate electrode is activated, the image data is transferred to the pixel via the drain electrode 1810. It is noted that this TFT embodiment contains only one gate crossover 1812 which aids in reducing parasitic capacitance.

Another set of TFT redesigns are shown in FIGS. 19A and 19B, 20A and 20B, and 21A and 21B to handle the unevenness of parasitic capacitance that might be introduced by the above described TFT remapping. As TFTs are remapped on the panel, it is possible for some TFTs on the panel to be implemented in different corners or quadrants of a pixel area. For example, some TFTs may be constructed in the upper left hand corner of the pixel area, some in the upper right hand corner of the pixel area and so on. If all such TFTs were constructed the same way, then it would be likely that the source-drain orientation would be reversed for left hand corner and right hand corner implementation. Such non-uniformity of construction might introduce uneven parasitic capacitance in the case of a given TFT misalignment.

Figure 19:
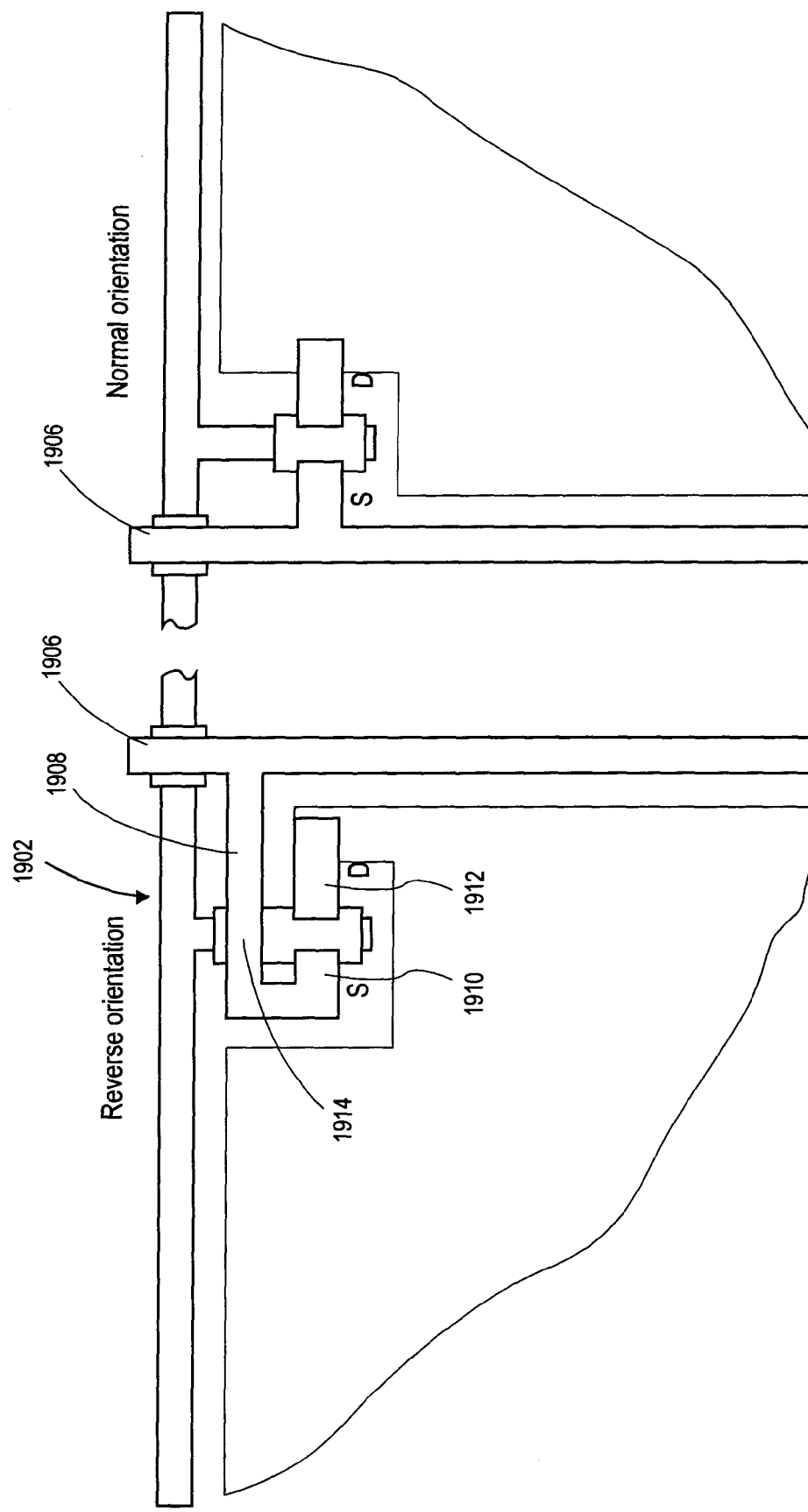
FIGS. 19A and 19B show TFT structures in a reverse orientation and a normal orientation, respectively.

FIGS. 19A and 19B show TFT structures in a reverse orientation and a normal orientation, respectively. For exemplary purposes, TFT 1904 is constructed within the upper left hand corner of its associated pixel in the usual manner—i.e. without any crossovers to avoid any introduced parasitic capacitance. It is noted that the source (S) and drain (D) electrodes are placed in a left-to-right fashion. TFT 1902 is shown constructed in the upper right hand corner of a pixel area in a reverse orientation—i.e. a crossover 1914 from source line 1906 is constructed so that the source electrode 1910 and drain electrode 1912 are also in left-to-right fashion. Thus, if there is a TFT misalignment in the horizontal direction, the TFTs 1902 and 1904 will receive the same amount of added parasitic capacitance—thus, keeping the panel's defects uniform. It will be appreciated that although TFT 1902 and TFT 1904 are depicted side-by-side and connected to the same column, this is primarily for explanatory purposes. It is unlikely that two adjoining subpixels would share the same column/data line—thus, TFT 1904 and its associated pixel is provided to show the distinction between a normal TFT orientation and TFT 1902 in a reverse orientation.

Figure 20:
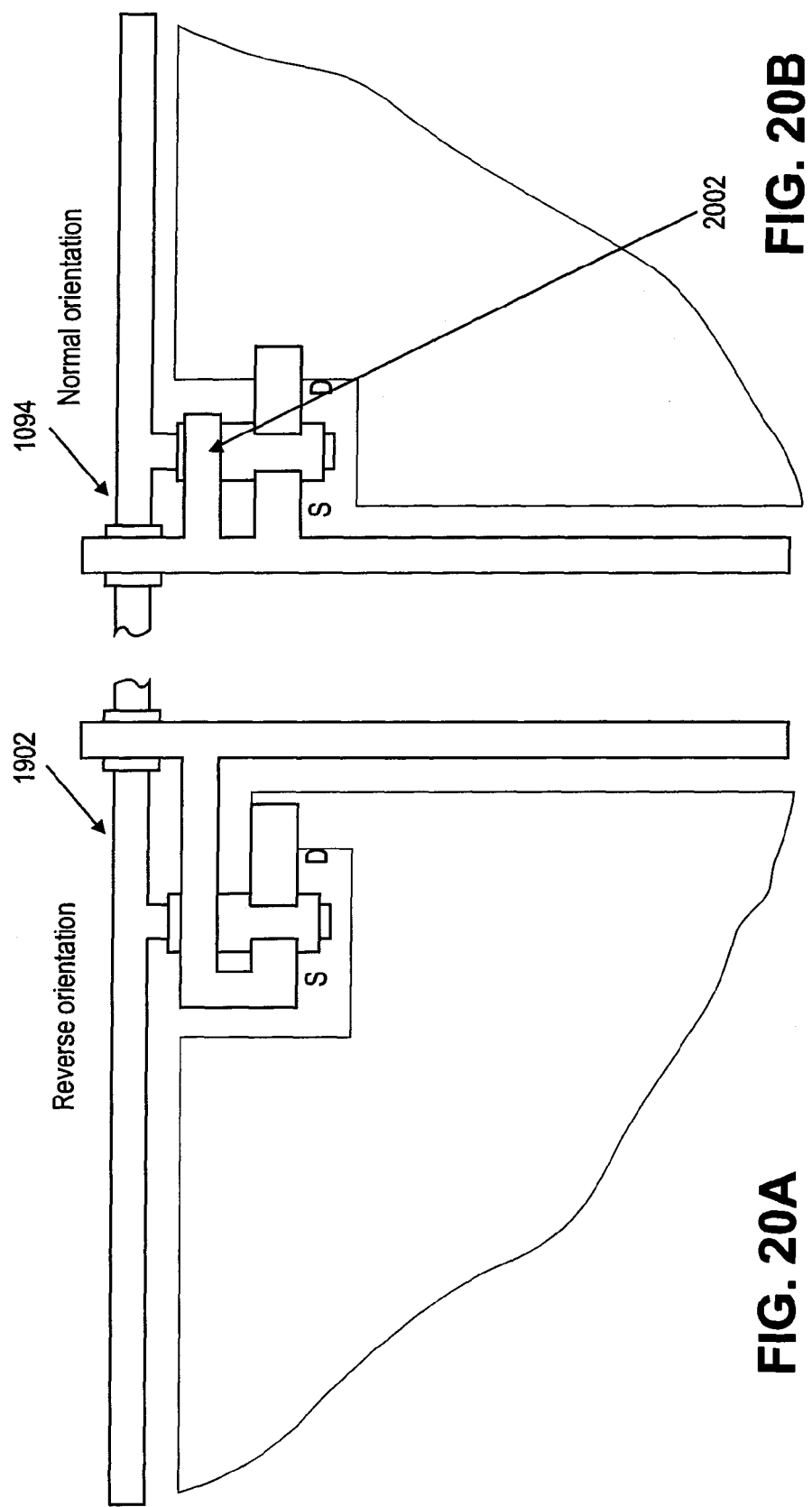
FIGS. 20A and 20B show TFT structures in a reverse orientation and a normal orientation, respectively, with an added gate crossover in the normal orientation to balance any parasitic capacitance found in the reverse orientation.
Figure 21:
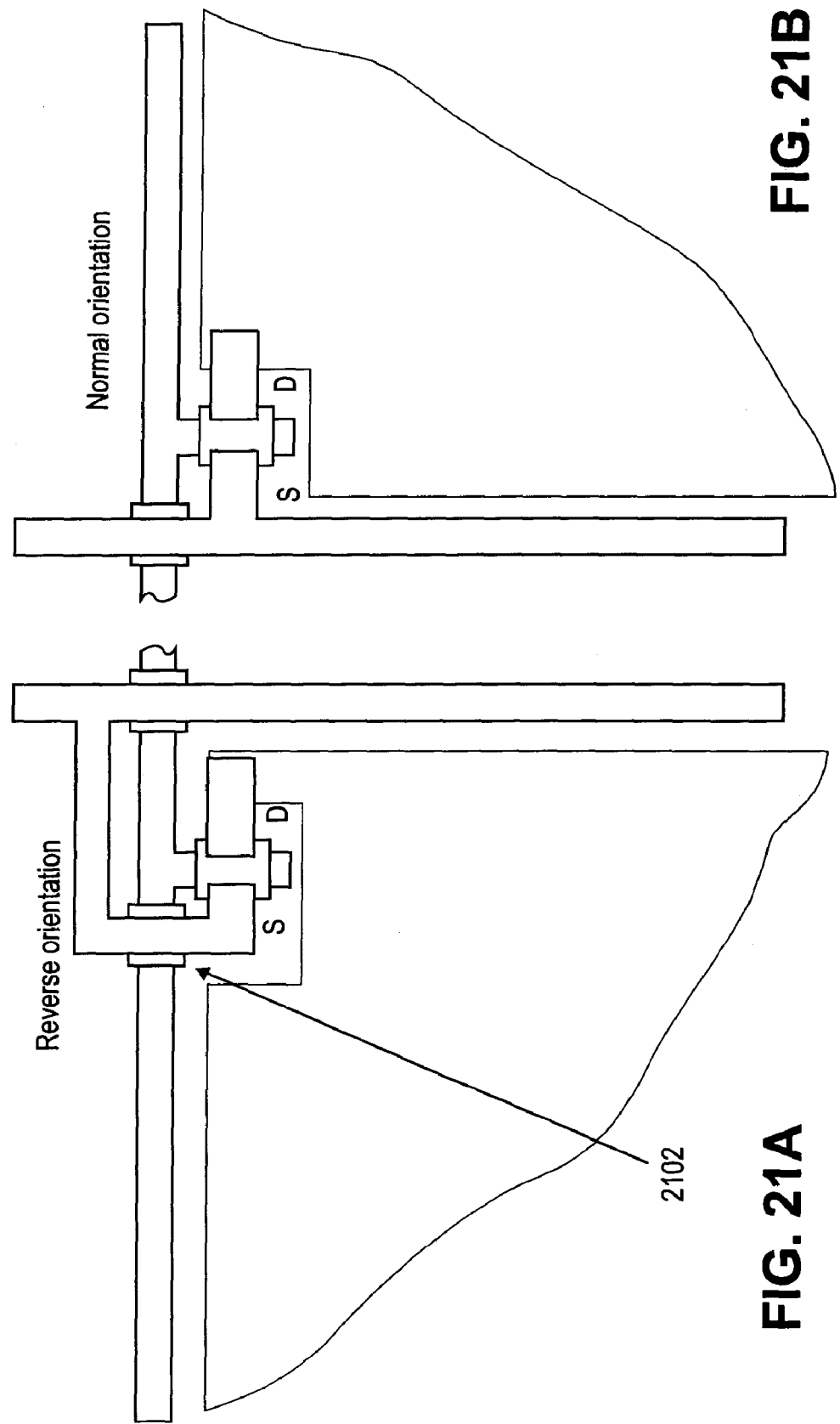
FIGS. 21A and 21B show TFT structures in a reverse orientation and a normal orientation, respectively, with one fewer gate crossover in the reverse orientation to match any parasitic capacitance in the normal orientation.

FIGS. 20A and 20B, and 21A and 21B show show other embodiments of TFTs 1902 and 1904. FIGS. 20A and 20B show TFT structures in a reverse orientation and a normal orientation, respectively, with an added gate crossover in the normal orientation to balance any parasitic capacitance found in the reverse orientation. As can be seen from FIGS. 20A and 20B, a new crossover 2002 is added to TFT 1904 so as to balance the added parasitic capacitance via crossover 1914. FIGS. 21A and 21B show TFT structures in a reverse orientation and a normal orientation, respectively, with one fewer gate crossover in the reverse orientation to match any parasitic capacitance in the normal orientation. As may be seen from FIGS. 21A and 21B, the gate electrode crossover 1914 has been removed in favor of a gate line crossover 2102 which may have a lesser impact on individual pixel elements.

Figure 22:
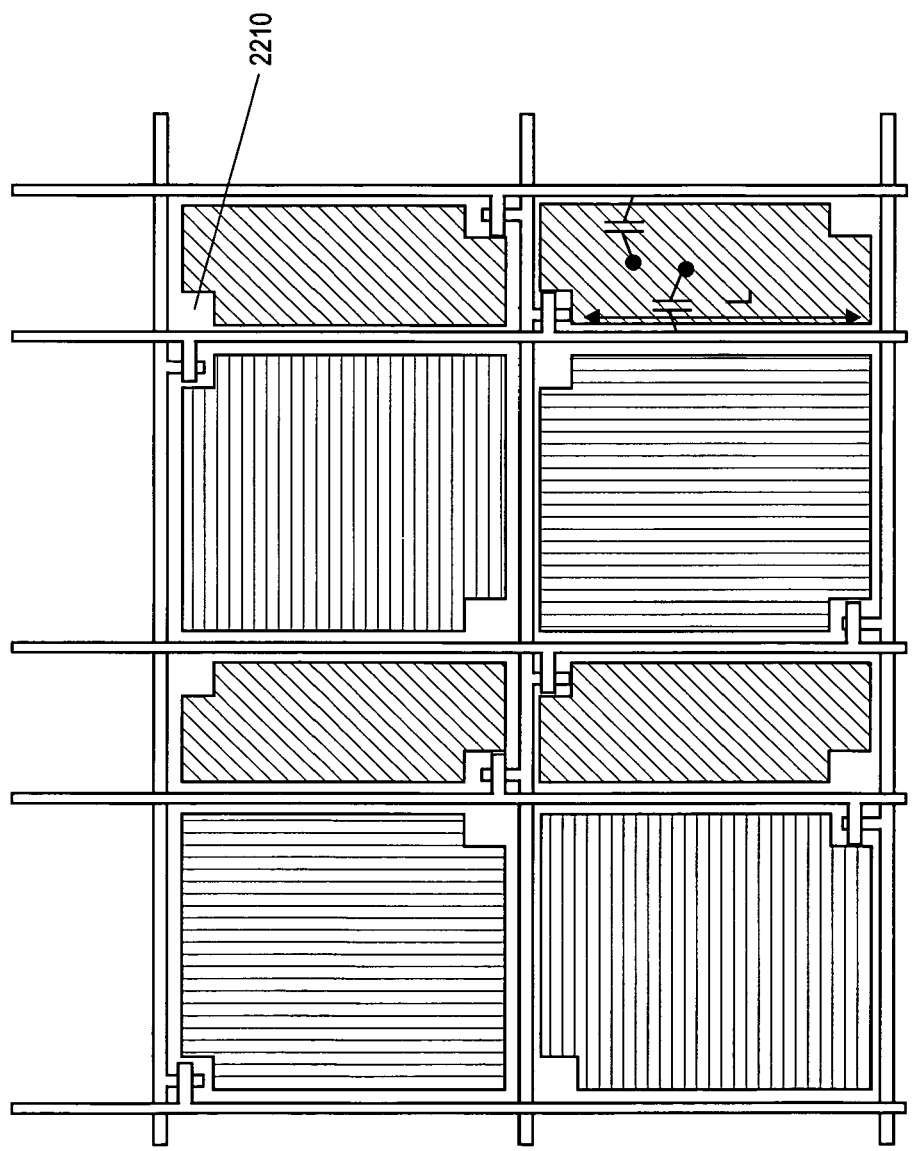
FIG. 22 shows one novel pixel element design having a corner removed from the pixel to balance parasitic capacitances.
Figure 23:
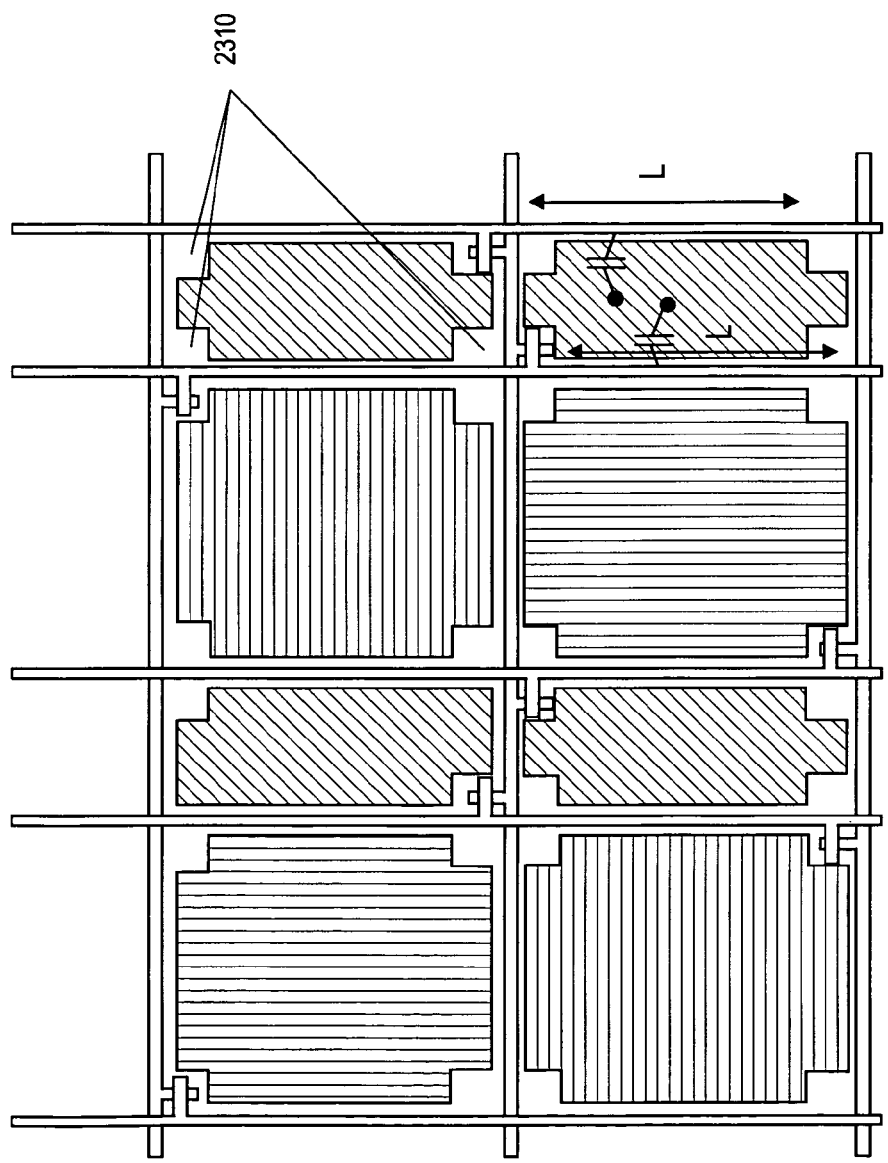
FIG. 23 shows yet another novel pixel element design having multiple corners removed to balance parasitic capacitances.

FIGS. 22 and 23 are embodiments of pixel elements with corners 2210 and 2310 removed to match the one corner removed containing the TFT structure. These pixel elements as designed here may balance the parasitic capacitances more than a normal pixel structure.

Figure 24:
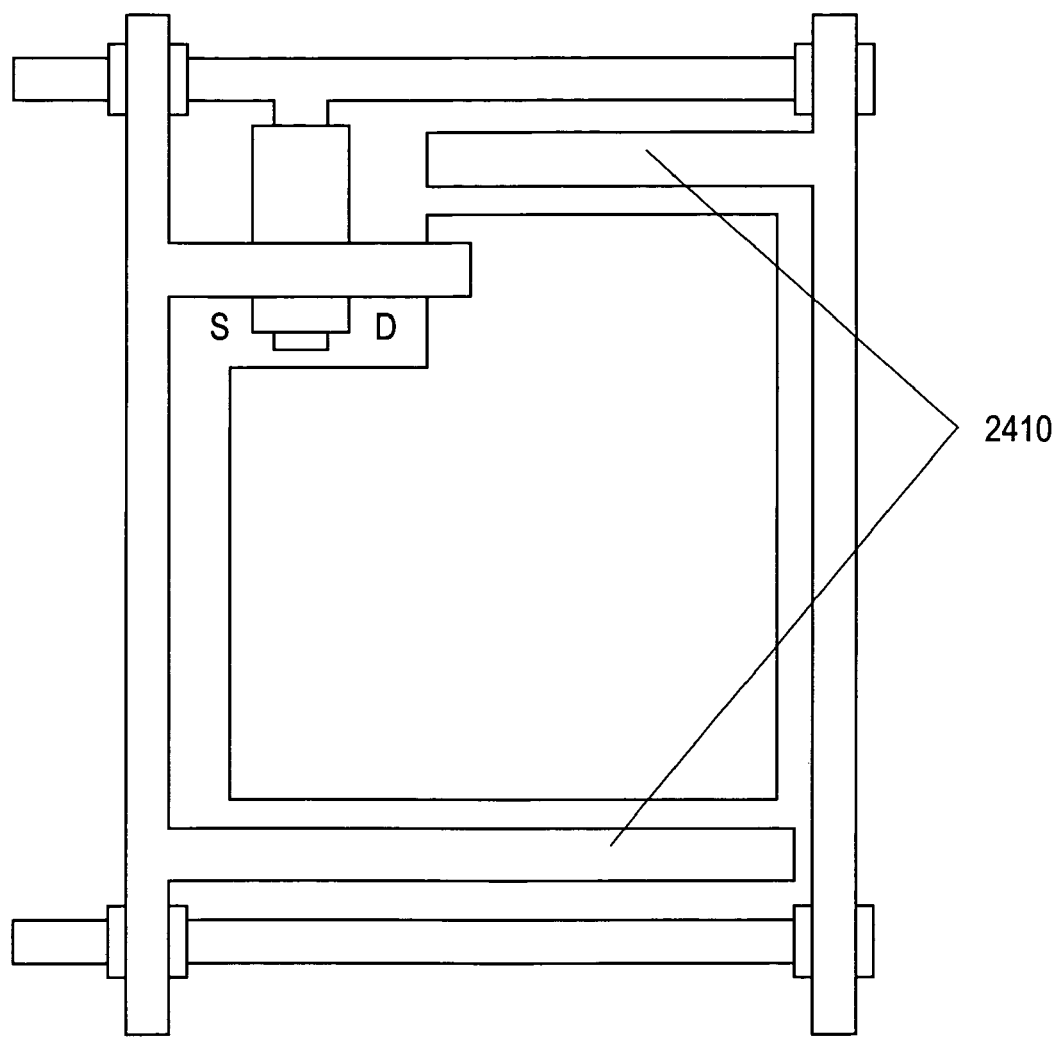
FIG. 24 shows yet another novel pixel structure in which at least one extra line is added to shield the pixel element from parasitic effects.

FIG. 24 is another embodiment of a pixel structure that employs at least one extra metal line 2410 that may help to shield the pixel element from the parasitic capacitances between the gate lines and the pixel element. Additionally, if a dot inversion scheme is employed, then the opposing polarities on both lines 2410 will also help to balance any parasitic capacitance between the source lines and the pixel elements.

What is claimed is:

1. A liquid crystal display comprising:
    a display panel substantially comprising a plurality of a subpixel repeating group tiled across said display panel in a regular pattern; the subpixel repeating group comprises two rows of an even number of subpixels; wherein each row of subpixels comprises at least two same-colored subpixels;
    each said subpixel having an associated thin film transistor (TFT) connecting to said subpixel at an intersection of a row line and a column line; said thin film transistor being formed in a corner of said subpixel in one of a group of quadrants with respect to said subpixel, the group comprising a first quadrant, a second quadrant, a third quadrant and a fourth quadrant such that the associated thin film transistors are substantially formed in at least two different quadrants with respect to their associated subpixels; a quadrant location of said associated TFT determining to which row line and to which column line a subpixel is connected and wherein the associated TFT of each of said same-colored subpixels in both rows is formed in a quadrant of its respective subpixel so as to connect all same-colored subpixels in both rows to a common row line; and driver circuitry configured to send image signals and polarity signals to said subpixels in one of a row and column direction such that same colored subpixels in said subpixel repeating group connected to said common row line forming a first direction are driven by alternating polarity signals.

2. The liquid crystal display of claim 1, wherein the polarity signals implement a 1×1 dot inversion scheme.

3. The liquid crystal display of claim 1, wherein the polarity signals implement a 1×2 dot inversion scheme.

4. The liquid crystal display of claim 1, wherein substantially every two incidences of a same colored subpixels along the first direction have a different polarity.

5. The liquid crystal display of claim 1, wherein the panel has at least a first region and a second region of subpixels such that each thin film transistor associated with a subpixel in the first region is formed substantially in a first numbered quadrant, and each thin film transistor associated with a subpixel in the second region is formed substantially in a second number quadrant different from the first numbered quadrant.

6. The liquid crystal display of claim 1, wherein the subpixel repeating group substantially comprises the pattern:
R G B G
B G R G.

7. The liquid crystal display of claim 1, wherein the subpixel repeating group substantially comprises the pattern:
R B G B
G B R B.

8. The liquid crystal display of claim 1, wherein the subpixel repeating group substantially comprises the pattern:
R G B G
R G B G
B G R G
B G R G.

9. A method for creating a liquid crystal display, said display comprising a display panel substantially comprising a plurality of a subpixel repeating group tiled across said display panel in a regular pattern; said subpixel repeating group comprising an even number of subpixels in a first direction, the method comprising:

choosing a subpixel repeating group such that the subpixel repeating group comprises two rows of an even number of subpixels wherein each row of subpixels comprises at least two same-colored subpixels;

choosing a dot inversion scheme to drive the subpixels; and for each subpixel in said repeating group, placing an associated thin film transistor in a quadrant of said subpixel; and wherein the associated TFT of each of said same-colored subpixels in both rows is placed in a quadrant of its respective subpixel so as to connect all same-colored subpixels in both rows to a common row line such that said dot inversion scheme, when effected on said subpixels, causes same colored subpixels to be driven by alternating polarity signals.

10. The method of claim 9, wherein placing thin film transistors reduces any image degradation due to parasitic capacitances at the subpixel.

11. The method of claim 9, wherein the dot inversion scheme is 1×1 dot inversion scheme.

12. The method of claim 9, wherein the dot inversion scheme is 1×2 dot inversion scheme.

13. The method of claim 9, wherein the subpixel repeating group substantially comprises the pattern:
R G B G
B G R G.

14. The method of claim 9 wherein said subpixel repeating group substantially comprises the pattern:
R B G B
G B R B.

15. The method of claim 9 wherein said subpixel repeating group substantially comprises the pattern:
R G B G
R G B G
B G R G
B G R G.

16. A liquid crystal display comprising:

a display panel substantially comprising a plurality of a subpixel repeating group tiled across said display panel in a regular pattern; the subpixel repeating group comprises two rows of an even number of subpixels; wherein each row of subpixels comprises at least two same-colored subpixels; said two rows of subpixels being connected to three row lines;

each subpixel having an associated thin film transistor with a gate, source, and drain; each gate of each thin film transistor being connected to one of said three row lines such that, when said row lines are activated according to a polarity scheme, successive same colored subpixels in each row of the group are driven with alternating polarity signals.

17. The liquid crystal display of claim 16, further comprising:

at least two adjacent subpixel repeating groups, and a row line that connects to transistors of the adjacent subpixel repeating groups such that same colored subpixels in a same row having alternating polarity.

18. A liquid crystal display comprising:

a display panel substantially comprising a plurality of a subpixel repeating group the subpixel repeating group comprises two rows of an even number of subpixels; wherein each row of subpixels comprises at least two same-colored subpixels; each said subpixel having an associated thin film transistor (TFT) connecting to said subpixel at an intersection of a row line and a column line; said TFT being formed in a corner of said subpixel in one of a group of quadrants with respect to said subpixel, the group comprising first, second, third and fourth quadrants such that the associated TFTs are substantially formed in at least two different quadrants with respect to their associated subpixels; a quadrant location of said associated TFT within said subpixel determining to which row line and to which column line a subpixel is connected; said quadrant locations of all TFTs on said display panel implementing a row-and-column-line connection pattern and wherein the associated TFT of each of said same-colored subpixels in both rows is formed in a quadrant of its respective subpixel so as to connect all same-colored subpixels in both rows to a common row line; and driver circuitry configured to send image signals and polarity signals to said subpixels along one of a row line and column line; said polarity signals implementing a polarity scheme which, when implemented in conjunction with said row-and-column-line connection pattern of said TFTs, reduces image artifacts on said display panel.

19. A liquid crystal display comprising:
a display panel substantially comprising a plurality of a subpixel repeating group tiled across said display panel in a regular pattern; the subpixel repeating group comprises subpixels in first and second primary colors; wherein, when the plurality of subpixel repeating groups is repeated across said display panel, said subpixels in said first and second primary colors alternate in columns on said display panel;
each said subpixel having an associated thin film transistor (TFT) connecting to said subpixel at an intersection of a row line and a column line; said thin film transistor being formed in a corner of said subpixel in one of a group of quadrants with respect to said subpixel, the group comprising a first quadrant, a second quadrant, a third quadrant and a fourth quadrant such that the associated thin film transistors are substantially formed in at least two different quadrants with respect to their associated subpixels; a quadrant location of said associated TFT determining to which row line and to which column line in a subpixel is connected and wherein the associated TFT of each first and second primary color subpixel is formed in a quadrant of said respective subpixel such that only subpixels in one primary color are connected to a common column line; and
driver circuitry configured to send image signals and polarity signals to said subpixels in one of a row and column direction such that same colored subpixels in said subpixel repeating group connected to said common column line are driven by alternating polarity signals.

* * * * *